US011240666B2

United States Patent
Zheng

(10) Patent No.: US 11,240,666 B2
(45) Date of Patent: Feb. 1, 2022

(54) AUTHENTICATION METHOD FOR ACCESSING NETWORK, AUTHENTICATION DEVICE, AND USER DEVICE

(71) Applicant: HUAWEI TECHNOLOGIES CO., LTD., Guangdong (CN)

(72) Inventor: Ruobin Zheng, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 89 days.

(21) Appl. No.: 16/598,472

(22) Filed: Oct. 10, 2019

(65) Prior Publication Data

US 2020/0045045 A1    Feb. 6, 2020

Related U.S. Application Data

(63) Continuation of application No. PCT/CN2018/084789, filed on Apr. 27, 2018.

(30) Foreign Application Priority Data

Apr. 27, 2017   (CN) .......................... 201710289715.7

(51) Int. Cl.
*H04W 12/069* (2021.01)
*H04L 29/06* (2006.01)
(Continued)

(52) U.S. Cl.
CPC ...... *H04W 12/069* (2021.01); *G06K 9/00892* (2013.01); *H04L 63/0861* (2013.01);
(Continued)

(58) Field of Classification Search
CPC ... H04W 12/069; H04W 12/08; H04W 12/63; H04W 12/68; H04W 12/06;
(Continued)

(56) References Cited

U.S. PATENT DOCUMENTS 7,194,632 B2   3/2007  Guerin et al.
8,369,580 B2   2/2013  Veldhuis et al.
(Continued)

FOREIGN PATENT DOCUMENTS

CN    101005359 A    7/2007
CN    102111418 A    6/2011
(Continued)

OTHER PUBLICATIONS

Anonymous: "Biometrics—Wikipedia,free encyclopedia", Feb. 5, 2015, XP055269771. (12 pages).
(Continued)

*Primary Examiner* — Mohammed Waliullah
(74) *Attorney, Agent, or Firm* — Westerman, Hattori, Daniels & Adrian, LLP

(57) ABSTRACT

This application discloses an authentication method for accessing a network, an authentication device, and a user device. The method includes: an authentication device receives an authentication response message sent by user device, where the authentication response message includes first data, and the first data is data obtained by the user device based on biometric feature data of a target user. The authentication device obtains second data from a server, where the second data is data obtained by the server based on biometric feature data of a user, and generates indication information when the first data is the same as the second data, where the indication information is used to indicate that the user device is authenticated. The authentication device sends the indication information to the user device.

12 Claims, 14 Drawing Sheets

(51) Int. Cl.
*H04W 12/08* (2021.01)
*H04W 12/63* (2021.01)
*H04W 12/68* (2021.01)
*G06K 9/00* (2006.01)

(52) U.S. Cl.
CPC .......... *H04L 63/102* (2013.01); *H04W 12/08* (2013.01); *H04W 12/63* (2021.01); *H04W 12/68* (2021.01)

(58) Field of Classification Search
CPC .. G06K 9/00892; G06K 9/00; H04L 63/0861; H04L 63/102
See application file for complete search history.

(56) References Cited

U.S. PATENT DOCUMENTS

| | | | |
|---|---|---|---|
| 2007/0239991 | A1 | 10/2007 | Cheng |
| 2012/0158969 | A1* | 6/2012 | Dempsky ............ H04L 61/6013 709/226 |
| 2017/0270530 | A1* | 9/2017 | Sheets .................... G06Q 20/20 |
| 2020/0320515 | A1* | 10/2020 | Basu ................ G06Q 20/38215 |

FOREIGN PATENT DOCUMENTS

| | | |
|---|---|---|
| CN | 102306305 A | 1/2012 |
| CN | 104954328 A | 9/2015 |
| CN | 104954329 A | 9/2015 |
| WO | 0143338 A1 | 6/2001 |

OTHER PUBLICATIONS

Office Action dated Apr. 12, 2019, issued in counterpart CN Application No. 201710289715.7, with English Translation. (16 pages).

Office Action dated Oct. 21, 2019, issued in counterpart CN Application No. 201710289715.7, with English Translation. (15 pages).

International Search Report dated Jul. 9, 2018, issued in PCT/CN2018/084789, with English Translation. (8 pages).

Extended (Supplementary) European Search Report dated Feb. 13, 2020, issued in counterpart EP Application No. 18790253.1. (8 pages).

Office Action dated Jan. 19, 2021, issued in counterpart EP Application No. 18 790 253.1 (7 pages).

* cited by examiner

AUTHENTICATION METHOD FOR ACCESSING NETWORK, AUTHENTICATION DEVICE, AND USER DEVICE

CROSS-REFERENCE TO RELATED APPLICATIONS

This application is a continuation of International Application No. PCT/CN2018/084789, filed on Apr. 27, 2018, which claims priority to Chinese Patent Application No. 201710289715.7, filed on Apr. 27, 2017. The disclosures of the aforementioned applications are hereby incorporated by reference in their entireties.

TECHNICAL FIELD

This application relates to the field of communications technologies, and in particular, to an authentication method for accessing a network, an authentication device, and a user device.

BACKGROUND

With rapid development of Internet technologies, the Internet can be wirelessly accessed in a home network or a public wireless network. For example, a Wireless Fidelity (Wi-Fi) technology can be used to wirelessly access the Internet in the home network or the public wireless network. The Wi-Fi technology is a technology that allows a user device to connect to a wireless local area network. When accessing a network based on the Wi-Fi technology, the user device often needs to perform an authentication operation.

In a related technology, a Wi-Fi technology is used as an example. When the Wi-Fi technology is used to wirelessly access the Internet in a home network or a public wireless network, the user device often performs an authentication operation based on a password. A password-based Internet access authentication manner requires a user to preset a password, and a process of setting the password is relatively complex. Currently, an authentication process for accessing a network is relatively complex, network usability is relatively poor, and security is relatively poor.

SUMMARY

Embodiments of this application provide an authentication method for accessing a network, an authentication device, and a user device, so as to improve network usability and security, and simplify an authentication process for accessing a network.

According to a first aspect, an authentication method for accessing a network is provided, and is applied to an authentication device. The method includes: receiving, by the authentication device, an authentication response message sent by a user device, where the authentication response message includes first data, and the first data is data obtained by the user device based on biometric feature data of a target user, then obtaining, by the authentication device, second data from a server, where the second data is data obtained by the server based on biometric feature data of a user; generating, by the authentication device, indication information when the first data is the same as the second data, where the indication information is used to indicate that the user device is authenticated; and then sending, by the authentication device, the indication information to the user device.

In this embodiment of this application, the user device and the authentication device use the biometric feature data to implement network access authentication without a need to perform a complex password setting operation, thereby simplifying an authentication process for accessing a network, and improving network usability and security.

The target user is a user who has a network access requirement. The target user may be a specific user (namely, an individual user), or may be a user of a specific type. For example, a type of the biometric feature data may include at least one of an image, a video, audio, or a text. The biometric feature data may include one or more of data representing an identity of a user, data representing a physical status of the user, or data representing an environment in which the user is located. The data representing the identity of the user may include one or more of data representing a facial feature, data representing an iris feature, data representing a fingerprint feature, data representing a body shape feature, data representing a capillary feature, or data representing a voice feature. The data representing the physical status of the user may include one or more of data representing a physical health status or data representing a motion status. The data representing the physical health status is also referred to as physiological data, such as a respiratory rate, a heart rate, a body temperature, and blood pressure. The data representing the motion status may be a moving speed of the user, including a walking speed, a running speed, and the like. The data representing the environment in which the user is located may be data representing a location of the user. The motion status in this application may also be used to indicate a body action and a facial action.

Optionally, the authentication response message further includes index information, and the obtaining second data from a server includes: sending a retrieval request message to the server provided with a database, where the retrieval request message includes the index information; receiving third data sent by the server provided with a database, where the third data is stored biometric feature data of the user that is obtained, based on the index information, by the server provided with a database; and converting the third data into the second data.

The server provided with a database pre-stores a dataset that includes n pieces of data, where n≥1, and all of the n pieces of data are data determined based on the biometric feature data of the user. The biometric feature data of the user may be collected in advance by using a collection device, to obtain the dataset. For example, biometric feature data of different individual users may be collected by using the collection device, or biometric feature data of different types of users may be collected by using the collection device. For example, when the user performs Internet access registration, the biometric feature data of the user may be collected by using the collection device, or when the user goes to an operator's business office (or a corresponding website) to open an account, the biometric feature data of the user may be collected by using the collection device.

In this embodiment of this application, the authentication response message sent by the user device to the authentication device may further include the index information, and correspondingly, the retrieval request message sent by the authentication device to the server provided with a database includes the index information, to avoid a plurality of times of converting the third data and comparing the first data with the second data, thereby improving authentication efficiency and user experience. The index information is used by the server provided with a database to search the dataset for the third data. The server provided with a database obtains the third data from the dataset through retrieval based on the index information in the retrieval request message, and the server provided with a database stores a correspondence between the index information and the third data. For example, the index information may be a user identifier, and the user identifier is used to identify the target user or the user device. The user identifier may be a user name of the target user, or the user identifier may be a unique code of the user device, a MAC address assigned to the user device, and an IP address assigned to the user device. The user identifier may be carried in each piece of data in the dataset stored in the server provided with a database.

For example, the authentication device may use the third data as the second data. In this case, the second data is the third data. Alternatively, the authentication device may convert the third data into the second data according to a rule or an algorithm. For example, the authentication device converts the third data into the second data by using a hash function, or converts the third data into the second data in a rotor machine encryption manner. A conversion manner in which the authentication device converts the third data into the second data is the same as a conversion manner in which the user device converts a target data into the first data.

Optionally, before the receiving an authentication response message sent by a user device, the authentication method for accessing a network further includes: receiving an authentication request message sent by the user device, where the authentication request message is used to request the authentication device to send random data; obtaining the random data; and sending the random data to the user device.

The converting the third data into the second data includes: calculating the third data and the random data by using a hash function, to obtain the second data.

To resist a playback attack, the authentication device obtains the random data, so that the authentication device obtains the second data based on the random data. In addition, the authentication device may send the random data to the user device, so that the user device converts the target data into the first data by using the random data. The random data is randomly generated data, and the random data may be randomly generated by the authentication device, or may be randomly generated by another device and then sent to the authentication device. Because the authentication device obtains different random data each time, an attacker cannot complete an authentication process by listening to last information. The authentication device may calculate the third data and the random data by using the hash function, to obtain the second data. The authentication device calculates the third data and the random data by using the hash function, so that a network listening attack can be effectively resisted, and network listening is invalid because it is relatively difficult to reversely crack the hash function.

Optionally, the first data is a first feature vector, the second data is the third data, the third data is a second feature vector, the first feature vector is a feature vector obtained by the user device based on the biometric feature data of the target user, and the second feature vector is a feature vector obtained by the server based on the biometric feature data of the user.

Alternatively, the first data is a first feature code, the second data is the third data, the third data is a second feature code, the first feature code is a feature code obtained after the user device converts a first feature vector, the first feature vector is a feature vector obtained by the user device based on the biometric feature data of the target user, the second feature code is a feature code obtained after the server converts a second feature vector, and the second feature vector is a feature vector obtained by the server based on the biometric feature data of the user.

Alternatively, the first data is a second feature vector, the second data is a third feature vector, the third data is a fourth feature vector, the random data is a random vector, the second feature vector is a feature vector obtained by calculating a first feature vector and the random vector by using a hash function, the third feature vector is a feature vector obtained by the user device based on the biometric feature data of the target user, and the fourth feature vector is a feature vector obtained by the server based on the biometric feature data of the user.

Alternatively, the first data is a second feature code, the second data is a third feature code, the third data is a fourth feature code, the random data is a random code, the second feature code is a feature code obtained by calculating a first feature code and the random code by using a hash function, the third feature code is a feature code obtained after the user device converts a first feature vector, the first feature vector is a feature vector obtained by the user device based on the biometric feature data of the target user, the fourth feature code is a feature code obtained after the server converts a second feature vector, and the second feature vector is a feature vector obtained by the server based on the biometric feature data of the user.

Optionally, after the sending the indication information to the user device, the method further includes: obtaining a communication credential; and communicating with the user device based on the communication credential.

The communication credential may be a communication password or a communication key.

For example, the authentication device may convert the third data sent by the server provided with a database into a communication credential. The user device may convert the target data into a communication credential. A conversion manner in which the user device converts the target data may be the same as or different from a conversion manner in which the authentication device converts the third data. When the conversion manner in which the user device converts the target data is the same as the conversion manner in which the authentication device converts the third data, the user device and the authentication device obtain a same communication credential. This process is applicable to a symmetric key encryption scenario. When the conversion manner in which the user device converts the target data is different from the conversion manner in which the authentication device converts the third data, the user device and the authentication device obtain different communication credentials. In this case, the user device obtains a user public key, and the authentication device obtains a user private key. This process is applicable to an asymmetric key encryption scenario.

For example, the authentication device may directly use the third data sent by the server provided with a database as the communication key. The user device may directly use the target data as the communication credential.

In this embodiment of this application, when the authentication device does not have a function of a gateway device, after obtaining the communication credential, the authentication device may further send the communication credential to a gateway device such as a home gateway, an access gateway (for example, an enterprise gateway), an IoT gateway, an access device, or an IP edge device, so that the user device communicates with the gateway device based on the communication credential. For example, the user device is a first home gateway, the gateway device is a second home gateway, and the second home gateway is an upper-level device of the first home gateway. The authentication device sends the communication key to the second home gateway, and the first home gateway communicates with the second home gateway based on the communication key.

In this embodiment of this application, after the user device is authenticated, the user device and the authentication device use the biometric feature data as the communication credential for communication, so that an exhaustive attack can be effectively resisted, and network security is improved.

According to a second aspect, an authentication method for accessing a network is provided, and is applied to a user device. The method includes: obtaining, by the user device, first data based on biometric feature data of a target user, where the first data is data obtained by the user device based on the data obtained by preprocessing a biometric feature of the target user, then sending, by the user device, an authentication response message to an authentication device, where the authentication response message includes the first data; and receiving, by the user device, indication information sent by the authentication device, where the indication information is used to indicate that the user device is authenticated.

In this embodiment of this application, the user device and the authentication device use the biometric feature data to implement network access authentication without a need to perform a complex password setting operation, thereby simplifying an authentication process for accessing a network, and improving network usability and security.

The target user may be a specific user (namely, an individual user), or may be a user of a specific type. For example, a type of the biometric feature data may include at least one of an image, a video, audio, or a text. The biometric feature data may include one or more of data representing an identity of a user, data representing a physical status of the user, or data representing an environment in which the user is located.

Optionally, the obtaining, by the user device, first data based on biometric feature data of a target user includes: collecting the biometric feature data of the target user; obtaining target data based on the biometric feature data of the target user, where the target data is the data obtained by preprocessing the biometric feature of the target user; and converting the target data into the first data.

Optionally, before the converting the target data into the first data, the authentication method for accessing a network further includes: sending an authentication request message to the authentication device, where the authentication request message is used to request the authentication device to send random data; and receiving the random data sent by the authentication device; and the converting the target data into the first data includes: calculating the target data and the random data by using a hash function, to obtain the first data.

For example, the user device may use the target data as the first data. In this case, the first data is the target data. Alternatively, the user device may convert the target data into the first data according to a rule or an algorithm. For example, the user device converts the target data into the first data by using a hash function, or converts the target data into the first data in a rotor machine encryption manner. When the user device receives the random data sent by the authentication device, the user device may calculate the target data and the random data by using the hash function, to obtain the first data. The user device calculates the target data and the random data by using the hash function, so that a network listening attack can be effectively resisted, and the target data is not transmitted in a plaintext.

Each time performing an authentication operation, the user device receives different random data sent by the authentication device. Therefore, an attacker cannot complete an authentication process by listening to last information.

Optionally, the first data is the target data, the target data is a first feature vector, and the first feature vector is a feature vector obtained by the user device based on the biometric feature data of the target user.

Alternatively, the first data is the target data, the target data is a first feature code, the first feature code is a feature code obtained after the user device converts a first feature vector, and the first feature vector is a feature vector obtained by the user device based on the biometric feature data of the target user.

Optionally, the first data is a second feature vector, the target data is a first feature vector, the random data is a random vector, and the first feature vector is a feature vector obtained by the user device based on the biometric feature data of the target user.

Alternatively, the first data is a second feature code, the target data is a first feature code, the first feature code is a feature code obtained after the user device converts a first feature vector, and the first feature vector is a feature vector obtained by the user device based on the biometric feature data of the target user.

Optionally, after the receiving indication information sent by the authentication device, the authentication method for accessing a network further includes: obtaining a communication credential; and communicating with the authentication device based on the communication credential, or communicating with a gateway device based on the communication credential, where the communication credential used by the gateway device is sent by the authentication device.

According to a third aspect, an authentication device is provided. The authentication device includes at least one module, and the at least one module is configured to implement the authentication method for accessing a network in the first aspect.

According to a fourth aspect, a user device is provided. The user device includes at least one module, and the at least one module is configured to implement the authentication method for accessing a network in the second aspect.

According to a fifth aspect, an authentication device is provided. The authentication device includes a processor, a memory, a network interface, and a bus. The bus is configured to connect the processor, the memory, and the network interface. The network interface is configured to implement a communication connection between the authentication device and a user device. The processor is configured to execute a program stored in the memory to implement the authentication method for accessing a network in the first aspect.

According to a sixth aspect, a user device is provided. The user device includes at least one processor and a memory. The processor can execute an application program stored in the memory to perform the authentication method for accessing a network in the second aspect.

The user device further includes a communications module, at least one communications bus, and an antenna. The user device further includes another function component, such as a battery module and a wired/wireless charging structure. The communications bus is configured to implement connection and communication between these components. The communications module may be used for communication. The antenna is configured to receive and send a signal. The processor communicates with each module and component by using the communications bus.

According to a seventh aspect, an authentication system for accessing a network is provided, and includes an authentication device and a user device. The authentication device is the authentication device in the third aspect, and the user device is the user device in the fourth aspect.

According to an eighth aspect, an authentication system for accessing a network is provided, and includes an authentication device and a user device. The authentication device is the authentication device in the fifth aspect, and the user device is the user device in the sixth aspect.

According to a ninth aspect, a computer readable storage medium is provided, and the computer readable storage medium stores an instruction. When running on a computer, the computer readable storage medium enables the computer to perform the authentication method for accessing a network in the first aspect.

According to a tenth aspect, a computer program product that includes an instruction is provided. When running on a computer, the computer program product enables the computer to perform the authentication method for accessing a network in the first aspect.

According to an eleventh aspect, a computer readable storage medium is provided, and the computer readable storage medium stores an instruction. When running on a computer, the computer readable storage medium enables the computer to perform the authentication method for accessing a network in the second aspect.

According to a twelfth aspect, a computer program product that includes an instruction is provided. When running on a computer, the computer program product enables the computer to perform the authentication method for accessing a network in the second aspect.

Technical effects obtained in the third aspect, the fifth aspect, the ninth aspect, and the tenth aspect are similar to technical effects obtained by using a corresponding technical means in the first aspect, and technical effects obtained in the fourth aspect, the sixth aspect, the eleventh aspect, and the twelfth aspect are similar to technical effects obtained by using a corresponding technical means in the second aspect. Details are not described herein again.

The technical solutions provided in the embodiments of this application bring the following beneficial effects:

The user device can obtain the first data according to the biometric feature data of the target user, and send an authentication response message that includes the first data to the authentication device. Then, the authentication device obtains the second data from the server, where the second data is the data obtained by the server based on the biometric feature data of the user. The authentication device generates the indication information when the first data is the same as the second data, and sends the indication information to the user device, where the indication information is used to indicate that the user device is authenticated. Compared with a related technology, in this application, the user device and the authentication device use the biometric feature data to implement network access authentication, and communicate with each other without a need to perform a complex password setting operation, thereby simplifying an authentication process for accessing a network, and improving network usability and security.

DESCRIPTION OF EMBODIMENTS

Figure 1:
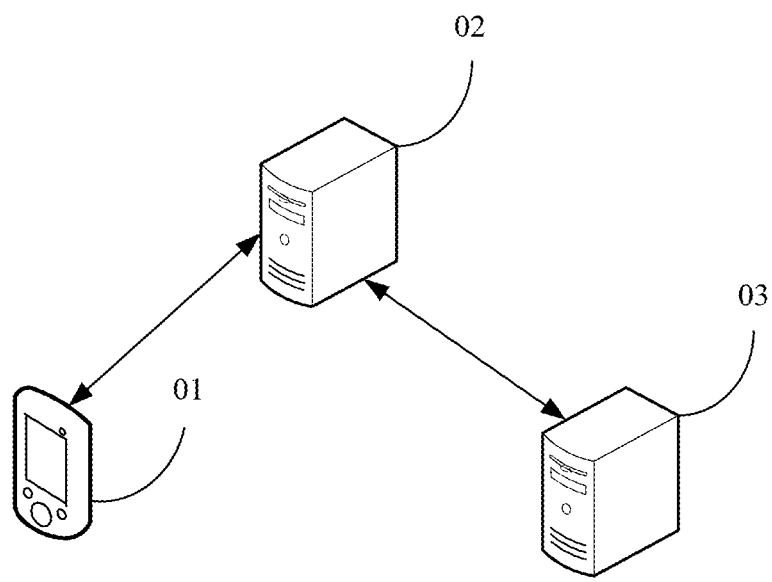
FIG. 1 is a schematic diagram of an implementation environment according to embodiments of this application.

To make the objectives, technical solutions, and advantages of this application clearer, the following further describes the implementations of this application in detail with reference to the accompanying drawings.

Usually, a technology such as Wi-Fi (for example, 802.11) or visible light communications (VLC) (for example, 802.15.7) is often used to wirelessly access the Internet in a home network. In this process, user device performs an authentication operation by using a password. When the user device performs the authentication operation by using the password, the following problems often exist: 1. A wireless device such as a Wi-Fi access point (AP) or customer-premises equipment (CPE) has relatively poor stability, and is often faulty. After a fault occurs, the wireless device or the customer-premises equipment needs to be reset and restarted. The wireless device is used as an example. Each time the wireless device is reset and restarted, a user needs to reset passwords of all user terminals at home. In an Internet of Things (IoT) era, there are a large quantity of user terminals of various types at home. Each time passwords of all user terminals are manually set, an operation is relatively cumbersome and usability is relatively poor. 2. Relatively high network skills are required for a user to manually set a password, and therefore a user who lacks network skills and knowledge at home cannot complete a complex and cumbersome password setting process. 3. The password is easily cracked by an attacker due to non-randomicity and a specific length of the password. 4. In consideration of security, a user name and the password that can be used to access a network are usually bound to a wired line port on which a home network communicates with an operator device, and therefore it is relatively difficult for a user terminal to implement automatic roaming.

Usually, a technology such as Wi-Fi, for example, 802.11, a cellular mobile network, for example, Code Division Multiple Access (CDMA), Long Term Evolution (LTE), or 5th Generation (5G) is often used to wirelessly access the Internet in a public wireless network such as public Wi-Fi (public Wi-Fi). In this process, a user device performs an authentication operation by using a password. When the user device performs the authentication operation by using the password, the following problems often exist: 1. A mobile phone is used as an example. A user needs to enter a mobile number, and then enter a mobile phone verification code. Therefore, a process is relatively cumbersome and usability is relatively poor, and an entire process requires an operator to provide an SMS verification code service. 2. A user who lacks network skills and knowledge does not use a public wireless network to access a network, but uses mobile data supported by a subscriber identity module (SIM) of the mobile phone, thereby increasing network access costs. 3. In a sparsely populated village, it is relatively difficult to construct the public wireless network, and therefore a passer-by needs to use a home Wi-Fi (home Wi-Fi) to access the Internet. However, a password is set for the home Wi-Fi, and the passer-by cannot obtain the password in advance. Therefore, the passer-by finally cannot normally use the home Wi-Fi.

Embodiments of this application provide an authentication method for accessing a network based on biometric feature data of a user, to resolve problems such as a relatively complex authentication process, relatively poor network usability, relatively poor security, and relatively poor user experience in a password-based authentication manner in a home network and a public wireless network. The biometric feature data may include one or more of data representing an identity of the user, data representing a physical status of the user, or data representing an environment in which the user is located. The data representing the identity of the user may include one or more of data representing a facial feature, data representing an iris feature, data representing a fingerprint feature, data representing a body shape feature, data representing a capillary feature, or data representing a voice feature. The data representing the physical status of the user may include one or more of data representing a physical health status or data representing a motion status. The data representing the physical health status is also referred to as physiological data, such as a respiratory rate, a heart rate, a body temperature, and blood pressure. The data representing the motion status may be a moving speed of the user, including a walking speed, a running speed, and the like. The data representing the environment in which the user is located may be data representing a location of the user. The motion status in this application may also be used to indicate a body action and a facial action. A type and content of the biometric feature data are not limited in this application.

In the embodiments provided in this application, after a user device is authenticated, the user device and an authentication device use the biometric feature data as a communication credential for communication. According to the method provided in the embodiments of this application, for a home network, the user does not need to set passwords of all user terminals at home for a plurality of times. The biometric feature data is unique, and complexity of the biometric feature data is far higher than complexity of a password. Therefore, the biometric feature data is not easily cracked by an attacker. The user does not need to remember the password, and therefore a user terminal can implement automatic roaming or nomadicity. The automatic roaming means that the user terminal obtains a network service by using a visited location network when moving outside a home location network. The nomadicity means that the user obtains a network service from different access points by using a same user terminal or different user terminals. According to the method provided in the embodiments of this application, for a public wireless network, the user does not need to enter a mobile number and a mobile phone verification code, and an operator does not need to provide an SMS verification code service, thereby simplifying a network access process. When the user goes abroad on business, a mobile phone can be connected to the public wireless network without a need to obtain the mobile phone verification code. The authentication method for accessing a network based on the biometric feature data provides a good technical basis for opening of home Wi-Fi, so that the opening of the home Wi-Fi becomes possible. An exhaustive attack can be effectively resisted in a communication manner based on the biometric feature data. The exhaustive attack is an attack manner in which an attacker successively performs a decryption test on an intercepted ciphertext by using a key in key space, to find a correct key. Some biometric feature data, such as data representing a facial feature, data representing a body shape feature, and data representing a voice feature is characterized by naturalness and being not perceived by a measured individual. Therefore, both network usability and user experience are relatively good. According to the authentication method based on the biometric feature data, an authentication process for accessing a network is simplified, and network usability, security, and user experience are improved.

The naturalness of the biometric feature data means that a manner of identifying the identity of the user based on the biometric feature data is the same as a manner used by a human being (or even another creature) for identification. For example, the human being may determine an identity of a person through distinguishing by comparing faces through observation, or may determine an identity of a person through distinguishing by observing a body shape, or may determine an identity of a person through distinguishing by listening to a voice. The characteristic of the biometric feature data that is not perceived by the measured individual means that it is not offensive to identify the identity of the user based on the biometric feature data, and an identification process does not easily attract a person's attention. Therefore, user experience is relatively good. For example, when the identity of the user is identified based on the data representing the facial feature, only visible light needs to be used to obtain a face image. Currently, a camera is configured on a smartphone, and therefore the face image is easily obtained by using the camera.

FIG. 1 is a schematic diagram of an implementation environment according to embodiments of this application. The implementation environment may include a user device 01, an authentication device 02, and a server 03 provided with a database.

The user device 01 may be an electronic device such as a user terminal, a home gateway (for example, a Wi-Fi AP), an access gateway (for example, an enterprise gateway), or an IoT gateway. The user terminal may be a mobile phone, a computer, a game console, an in-vehicle device, a vending machine, a robot, a medical device, a wearable device, or the like.

The authentication device 02 may be a device disposed inside a network device (or a server) such as CPE (such as a home gateway or an enterprise gateway), an access node (AN), an Internet Protocol (IP) edge (Edge) device, a cable modem termination system (CMTS), or a converged cable access platform (CCAP). The authentication device 02 may be some or all of these network devices (or servers). The AN may be an optical line terminal (OLT), an optical network unit (ONU), a digital subscriber line access multiplexer (DSLAM), or the like. The IP edge device may be a broadband access server (BRAS) or a broadband network gateway (BNG). The authentication device 02 may have a function of a gateway device.

The server 03 provided with a database may be a server, a server cluster including several servers, or a cloud computing service center. The server 03 provided with a database stores biometric feature data of a user.

For example, when accessing a network by using a Wi-Fi technology, the user device 01 sends an authentication response message to the authentication device 02, and the authentication device 02 sends an authentication result to the user device 01. When the user device 01 is authenticated, the user device 01 and the authentication device 02 separately obtain a communication key, and communicate with each other based on the communication key.

When the authentication device 02 does not have a function of a gateway device, the implementation environment may further include a gateway device such as a home gateway, an access gateway (for example, an enterprise gateway), an IoT gateway, an access device, or an IP edge device. When the user device 01 is authenticated, the user device 01 and the authentication device 02 separately obtain a communication key, the authentication device 02 may send the communication key to the gateway device, and the user device 01 communicates with the gateway device based on the communication key. For example, the user device 01 is a first IoT gateway, the gateway device is a second IoT gateway, and the second IoT gateway is an upper-level device of the first IoT gateway. The authentication device 02 sends the communication key to the second IoT gateway, and the first IoT gateway communicates with the second IoT gateway based on the communication key.

Figure 2A:
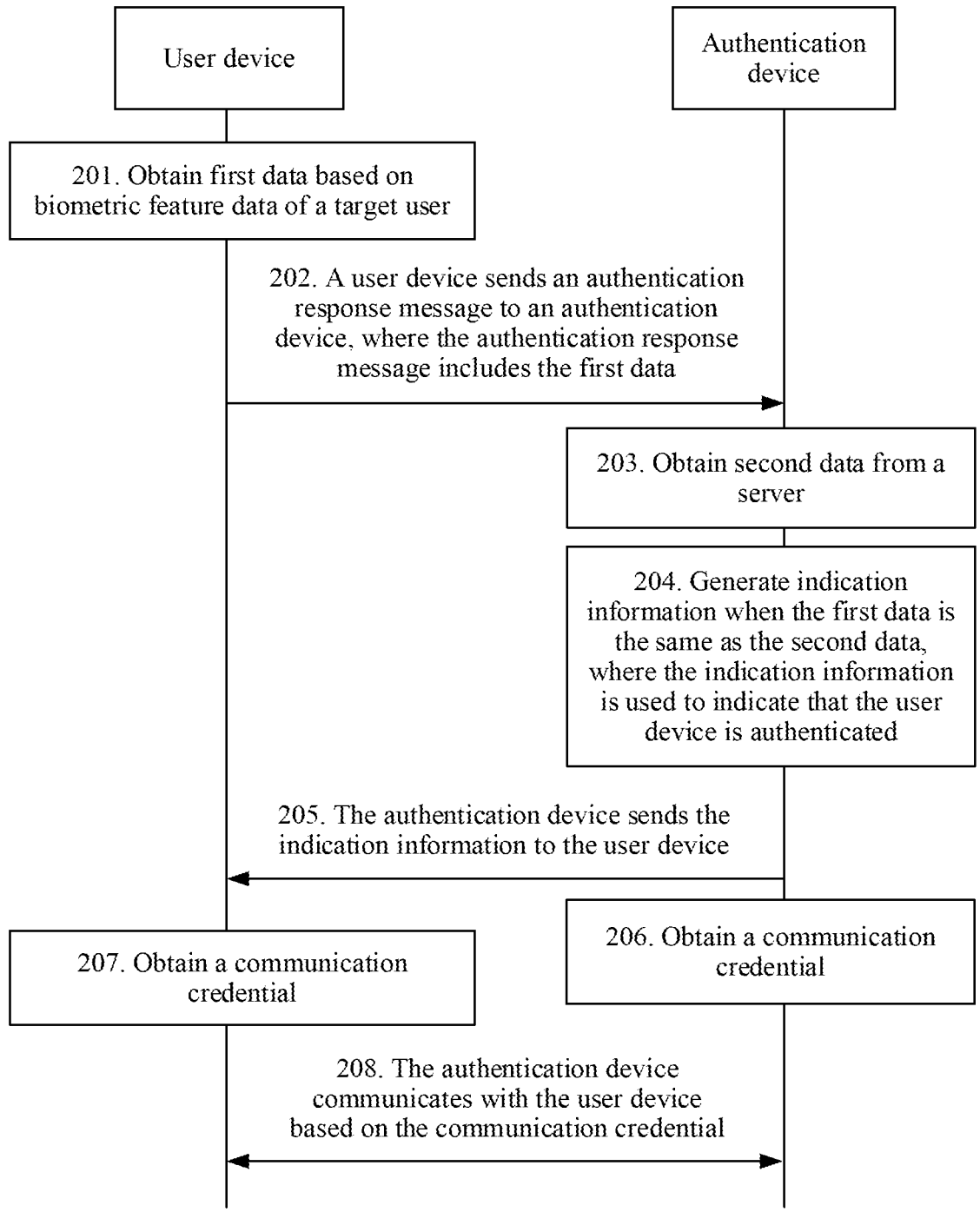
FIG. 2A is a flowchart of an authentication method for accessing a network according to an embodiment of this application.

FIG. 2A is a flowchart of an authentication method for accessing a network according to an embodiment of this application. The method may be used in the implementation environment shown in FIG. 1. As shown in FIG. 2A, the method may include the following steps.

Step 201: A user device obtains first data based on biometric feature data of a target user.

The target user is a user who has a network access requirement. The first data is data obtained by the user device based on the data obtained by preprocessing a biometric feature of the target user. The first data is used to determine whether the user device of the target user is authenticated. In this embodiment of this application, the target user may be a specific user (namely, an individual user), or may be a user of a specific type. Different individual users have different biometric feature data, and different types of users have different biometric feature data. For example, when the target user is a user A, biometric feature data of the user A is different from biometric feature data of a user B. For example, data representing a facial feature of the user A is different from data representing a facial feature of the user B. When the target user is a user of an F type, biometric feature data of the user of the F type is different from biometric feature data of a user of an F2 type. For example, data representing a location of a type of user located in a shopping mall is different from data representing a location of a type of user located outside the shopping mall.

Figure 2B:
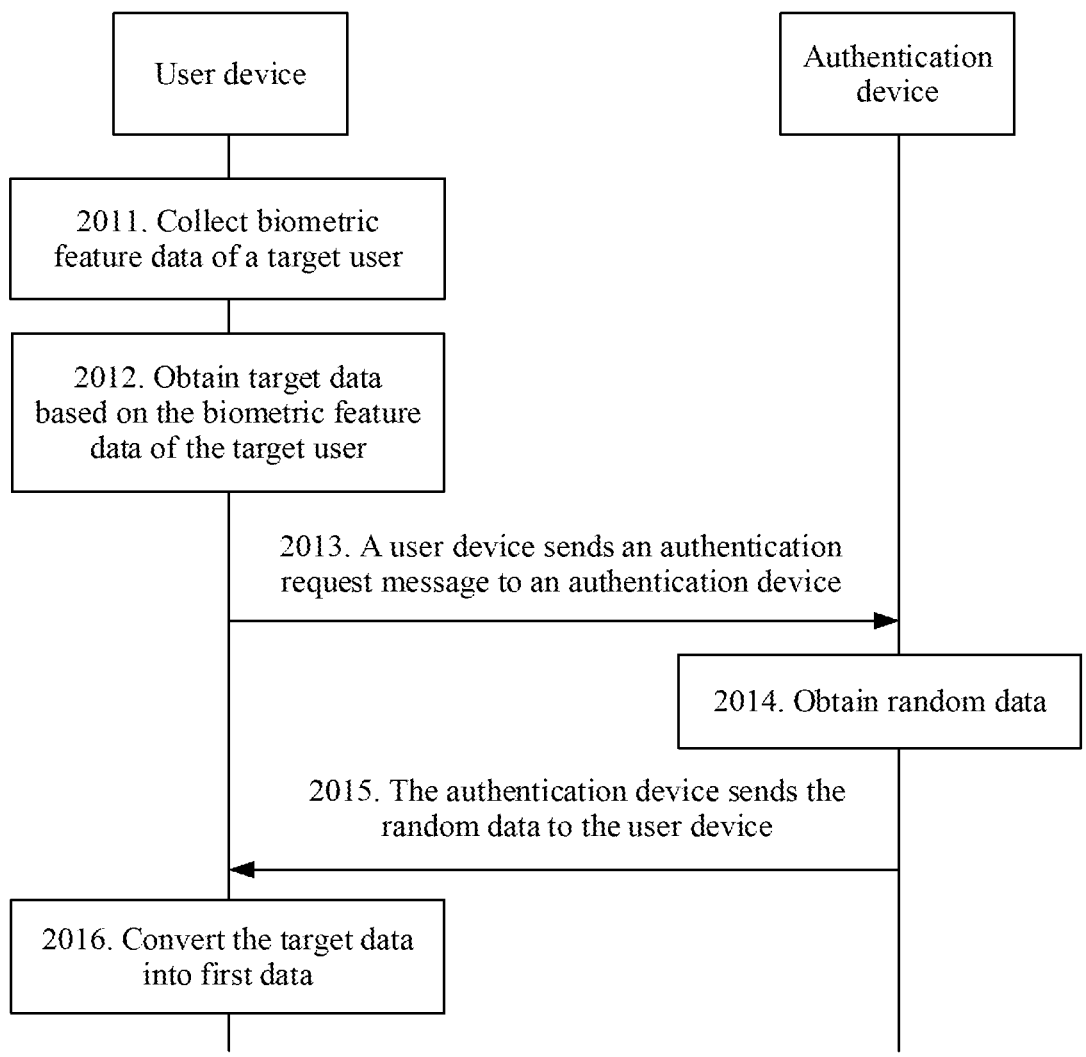
FIG. 2B is a flowchart of obtaining first data according to an embodiment of this application.

For example, as shown in FIG. 2B, step 201 may include the following steps.

Step 2011: The user device collects the biometric feature data of the target user.

For example, when the biometric feature data is data representing a facial feature, the user device may obtain the biometric feature data of the target user by using a camera. When the biometric feature data is data representing a fingerprint feature, the user device may obtain the biometric feature data of the target user by using a fingerprint pressure sensor. When the biometric feature data is data representing an iris feature, the user device may obtain the biometric feature data of the target user by using an infrared iris image collector. When the biometric feature data is data representing a voice feature, the user device may obtain the biometric feature data of the target user by using a microphone. When the biometric feature data is data representing a location of a user, the user device may obtain the biometric feature data of the target user by using a Global Positioning System (GPS) locator. When the biometric feature data is body temperature data, the user device may obtain the biometric feature data of the target user by using a thermometer. Alternatively, the biometric feature data may be other data that changes over time and space.

For example, a type of the biometric feature data may include one or more of an image, a video, audio, or a text. For example, when the biometric feature data is data representing a facial feature, the type of the biometric feature data may be an image. When the biometric feature data is data representing a voice feature, the type of the biometric feature data may be audio. When the biometric feature data is data representing a body action (such as a head-shaking action or an arm-stretching action), the type of the biometric feature data may be a video or an image. When the biometric feature data is data representing a facial action (such as an eye-blinking action), the type of the biometric feature data may be a video. When the biometric feature data is data representing a body action or data representing a facial action, the user device may prompt, through a voice, a text, or the like, the target user to perform a corresponding action, and then the user device collects the biometric feature data of the target user based on the action performed by the target user.

For example, when the biometric feature data includes a plurality of types, three types of biometric feature data, namely, an image, a video, and audio may be used as main data for identifying an identity of a user, and other types of biometric feature data may be used as auxiliary data for identifying the identity of the user.

Step 2012: The user device obtains target data based on the biometric feature data of the target user.

The target data is the data obtained by preprocessing the biometric feature of the target user.

The user device preprocesses the biometric feature data of the target user that is collected in step 2011, and filters out data that is unrelated to the biometric feature data of the target user, to obtain the target data. For example, the user device obtains a face image of the target user, and then filters out background information of the face image. The user device filters out a voice segment that is unrelated to a voice segment of the target user. For example, the user device may obtain a feature coding value or a scale-invariant feature transform (SIFT) feature through calculation based on the face image. The user device may obtain an audio signature, a location, a time, a tone, or loudness through parsing based on the voice segment. For example, the user device may extract the target data from the collected face image based on an eye, a nose, and a mouth, and the user device determines information that does not include the eye, the nose, and the mouth as information that is unrelated to the biometric feature data of the target user. For another example, the user device may extract, from the voice segment of the target user, data of sound located in a frequency range from 100 Hz (Hertz) to 1000 Hz, use the extracted data of the sound as the target data, and filter out data of sound below 100 Hz and data of sound above 1000 Hz. In addition, in actual application, sound of the target user does not have a fixed frequency. Therefore, the user device may filter out data of sound that is located in the frequency range from 100 Hz to 1000 Hz and that is of the fixed frequency.

It should be additionally noted that in this embodiment of this application, a trigger condition may be used to trigger the user device to obtain the target data. For example, when the user device is powered on, the user device may be triggered to obtain the target data based on data representing a facial feature of the target user or data representing a voice feature. When the target user starts an authentication program installed on the user device, the user device may be triggered to obtain the target data based on data representing a facial feature of the target user or data representing a voice feature. When the user device enters an area (for example, an area in which a villa is located or an area in which a shopping mall is located), the user device may be triggered to obtain the target data based on data representing a location of the target user. When the biometric feature data is the data representing the location of the target user, the target data may include a reference location of an area (for example, a central location of an area in which a villa is located) and an offset from the location of the target user to the reference location. When a body temperature of the target user exceeds a preset value, a heart rate of the target user is higher than a preset value, blood pressure of the target user is higher than a preset value, or a respiratory rate of the target user is lower than a preset value, the user device may be triggered to obtain the target data based on physiological data of the target user. When the biometric feature data is the physiological data of the target user, the target data may include a reference value and an offset from an actual value to the reference value. For example, when a body temperature of the target user exceeds a preset value (for example, 39.5 degrees) and reaches 40.5 degrees, the user device is triggered to obtain the target data based on body temperature data of the target user. The target data includes 39.5 degrees and 1 degree, 39.5 degrees is a reference value, and 1 degree is an offset from the actual value to the reference value.

Step 2013: The user device sends an authentication request message to an authentication device.

The authentication request message is used to request the authentication device to send random data.

In an implementation, the authentication request message may be carried in an Extensible Authentication Protocol (EAP) message or a Dynamic Host Configuration Protocol (DHCP) message. In a related technology, the authentication request message is used to instruct the user device to request to perform an authentication operation, and the authentication request message includes a device identifier that indicates the user device. The authentication device distinguishes between different user devices based on the device identifier. For example, the device identifier may be a Media Access Control (MAC) address or an IP address assigned to the user device.

Step 2014: The authentication device obtains random data.

To resist a playback attack, the authentication device obtains the random data, so that the authentication device obtains second data based on the random data. In addition, the authentication device may send the random data to the user device, so that the user device converts the target data into the first data by using the random data. The random data is randomly generated data, and the random data may be randomly generated by the authentication device, or may be randomly generated by another device and then sent to the authentication device.

2015. The authentication device sends the random data to the user device.

Each time performing an authentication operation, the user device receives different random data sent by the authentication device. Therefore, an attacker cannot complete an authentication process by listening to last information.

Step 2016: The user device converts the target data into the first data.

The user device converts the target data in step 2012 into the first data. For example, the user device may use the target data as the first data. In this case, the first data is the target data. Alternatively, the user device may convert the target data into the first data according to a rule or an algorithm. For example, the user device converts the target data into the first data by using a hash function, or converts the target data into the first data in a rotor machine (Rotor Machines) encryption manner. It is relatively difficult to reversely crack the hash function, and therefore the user device can use the hash function to effectively resist a network listening attack, so that the target data is not transmitted in a plaintext. The hash function may be a message digest algorithm 5 (MD5), a secure hash algorithm (SHA-1), a RACE integrity primitives evaluation message digest (RIPEMD-160) algorithm, a hashed message authentication code (HMAC) algorithm, or the like. The RIPEMD-160 is a 160-bit encryption hash function. The rotor machine encryption manner is used to perform a shift operation on to-be-converted data.

In an implementation, when the user device converts the target data by using the hash function, the user device may calculate the target data and the random data by using the hash function, to obtain the first data. In another implementation, the user device may perform a hash operation on the target data to obtain the first data. In this way, the authentication device does not need to obtain the random data and to send the random data to the user device.

In an implementation, when the user device converts the target data in the rotor machine encryption manner, the user device may perform a shift operation on a superimposition result of the target data and the random data in the rotor machine encryption manner, to obtain the first data. In another implementation, the user device may perform a shift operation on the target data in the rotor machine encryption manner to obtain the first data. In this way, the authentication device does not need to obtain the random data and to send the random data to the user device.

Step 202: The user device sends an authentication response message to the authentication device, where the authentication response message includes the first data.

Step 203: The authentication device obtains second data from a server.

The second data is data obtained by the server based on biometric feature data of a user.

Figure 2C:
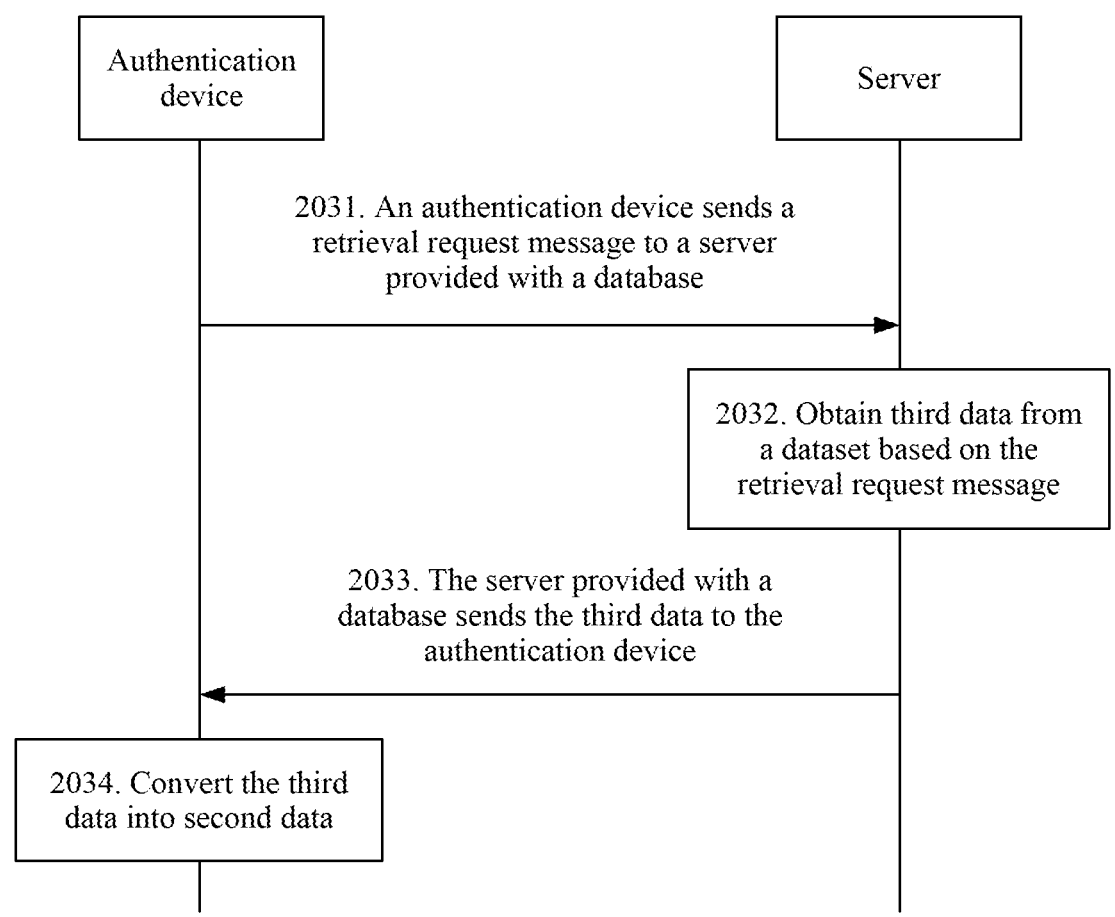
FIG. 2C is a flowchart of obtaining second data according to an embodiment of this application.

For example, as shown in FIG. 2C, step 203 may include the following steps.

Step 2031: The authentication device sends a retrieval request message to the server provided with a database.

The authentication device sends the retrieval request message to the server provided with a database, where the retrieval request message is used to instruct the server provided with a database to obtain third data from a dataset, and to send the third data to the authentication device.

Step 2032: The server provided with a database obtains third data from a dataset based on the retrieval request message.

Step 2033: The server provided with a database sends the third data to the authentication device.

The server provided with a database pre-stores a dataset that includes n pieces of data, where n≥1, and all of the n pieces of data are data determined based on the biometric feature data of the user. The biometric feature data of the user may be collected in advance by using a collection device, to obtain the dataset. For example, biometric feature data of different individual users may be collected by using the collection device, or biometric feature data of different types of users may be collected by using the collection device. For example, when the user performs Internet access registration, the biometric feature data of the user may be collected by using the collection device; or when the user goes to an operator's business office (or a corresponding website) to open an account, the biometric feature data of the user may be collected by using the collection device. For a method for obtaining data in the dataset, refer to a method for obtaining the target data in step 201. Examples are not given herein for description. The data included in the dataset may include biometric feature data of a plurality of objects of a face, for example, biometric feature data of an eye, biometric feature data of an eyebrow, biometric feature data of a mouth, and biometric feature data of an ear. Alternatively, the data included in the dataset may include a topological geometry relationship of a face, special feature (such as a black nevus or a scar) data of a face, or the like.

Step 2034: The authentication device converts the third data into the second data.

For example, the authentication device may use the third data as the second data. In this case, the second data is the third data. Alternatively, the authentication device may convert the third data into the second data according to a rule or an algorithm. For example, the authentication device converts the third data into the second data by using a hash function, or converts the third data into the second data in a rotor machine encryption manner. A conversion manner in which the authentication device converts the third data into the second data is the same as a conversion manner in which the user device converts the target data into the first data in step 2016. Further, when the authentication device performs step 2014, in other words, the authentication device obtains the random data, the authentication device may calculate the third data and the random data by using a hash function, to obtain the second data. The authentication device and the user device use a same hash function or a matched hash function, so that a same result is obtained through calculation based on same data and the same hash function. The authentication device may alternatively perform a shift operation on a superimposition result of the third data and the random data in a rotor machine encryption manner, to obtain the second data. The authentication device and the user device use a same shift rule, so that a same result is obtained by performing a same shift operation.

Step 204: The authentication device generates indication information when the first data is the same as the second data, where the indication information is used to indicate that the user device is authenticated.

Step 205: The authentication device sends the indication information to the user device.

After obtaining the first data and the second data, the authentication device compares the first data with the second data. For example, a dataset includes five pieces of data: Da, Db, Dc, Dd, and De, and the authentication device converts the data Da into the second data. The authentication device compares the second data with the first data. If the first data is Dx, and the authentication device determines that the second data is different from the first data Dx, the authentication device may send a response message to the server provided with a database, and the server provided with a database obtains the data Db from the dataset based on the response message, and sends the data Db to the authentication device. Then, the authentication device converts the data Db into the second data, and the authentication device compares the second data with the first data Dx to determine that the second data is the same as the first data Dx. In this case, the authentication device generates the indication information, and sends the indication information to the user device. This process can be completed by using a big data technology.

The authentication response message in step 202 may further include index information, and the index information is used by the server provided with a database to search the dataset for the third data, to improve authentication efficiency and user experience. The retrieval request message in step 2031 includes the index information. In step 2032, the server provided with a database may obtain the third data from the dataset through retrieval based on the index information in the retrieval request message. The server provided with a database stores a correspondence between the index information and the third data. The index information may be a user identifier, and the user identifier is used to identify the target user or the user device. The user identifier may be a user name of the target user. Alternatively, the user identifier may be a unique code of the user device, a MAC address assigned to the user device, and an IP address assigned to the user device. The user identifier may be carried in each piece of data in the dataset stored in the server provided with a database. For example, the user name of the target user is used as an index value of data representing a facial feature, and the server provided with a database can quickly obtain, through retrieval based on the user name, the data representing the facial feature of the target user. GPS location data of the target user is used as an index value of data representing a facial feature, and the server provided with a database can quickly obtain, through retrieval based on the GPS location data, the data, in a corresponding location, representing the facial feature.

For example, the user device may obtain the user identifier through external input. For example, the target user may enter the user identifier through manual input, voice input, or the like. The user device can read a statically configured user identifier. The user identifier may be carried in the authentication response message sent by the user device to the authentication device. Optionally, the user identifier may alternatively be carried in the authentication request message in step 2013.

Step 206: The authentication device obtains a communication credential.

For example, the authentication device may convert the third data sent by the server provided with a database into the communication credential. Alternatively, the authentication device may use the third data sent by the server provided with a database as the communication credential.

The communication credential may be a communication password or a communication key.

Step 207: The user device obtains a communication credential.

For example, the user device may convert the target data in step 2012 into the communication credential. Alternatively, the user device may use the target data as the communication credential. A conversion manner in which the user device converts the target data may be the same as or different from a conversion manner in which the authentication device converts the third data.

When the conversion manner in which the user device converts the target data is the same as the conversion manner in which the authentication device converts the third data, the user device and the authentication device obtain a same communication credential. This process is applicable to a symmetric key encryption scenario. For example, before the user device sends data to the authentication device, the user device encrypts the data by using a communication key, and then sends encrypted data to the authentication device. The authentication device receives the encrypted data, and then decrypts the encrypted data by using the same communication key.

When the conversion manner in which the user device converts the target data is different from the conversion manner in which the authentication device converts the third data, the user device and the authentication device obtain different communication credentials. This process is applicable to an asymmetric key encryption scenario. In this case, the user device obtains a user public key, and the authentication device obtains a user private key. Specifically, before the user device sends data to the authentication device, the user device first encrypts the data by using the user public key, and then sends encrypted data to the authentication device. The authentication device receives the encrypted data, and then decrypts the encrypted data by using the user private key. The user device may convert the target data by using an RSA algorithm or an ellipse curve to obtain the user public key. The authentication device may convert the third data by using an RSA algorithm or an ellipse curve to obtain the user private key.

Step 208: The authentication device communicates with the user device based on the communication credential.

In this embodiment of this application, when the authentication device does not have a function of a gateway device, after obtaining the communication credential, the authentication device may further send the communication credential to a gateway device such as a home gateway, an access gateway (for example, an enterprise gateway), an IoT gateway, an access device, or an IP edge device, so that the user device communicates with the gateway device based on the communication credential. For example, the user device is a first home gateway, the gateway device is a second home gateway, and the second home gateway is an upper-level device of the first home gateway. The authentication device sends the communication key to the second home gateway, and the first home gateway communicates with the second home gateway based on the communication key.

For example, according to the authentication method for accessing a network provided in this embodiment of this application, when a body temperature of the target user exceeds a preset value (for example, 39.5 degrees) and reaches 40.5 degrees, the user device is triggered to obtain the target data based on body temperature data of the target user. The target data includes 39.5 degrees and 1 degree, 39.5 degrees is a reference value, and 1 degree is an offset from the actual value to the reference value. The user device uses the target data as the first data, the user device sends the authentication response message that includes the first data to the authentication device, and the authentication device obtains the second data from the server. When the first data is the same as the second data, the user device is authenticated, and the user device is connected to a home network, and sends prompt information to a terminal in a hospital, so that a doctor can be sent, from the hospital in a timely manner, to treat a high-fever patient.

According to the authentication method for accessing a network provided in this embodiment of this application, the user device and the authentication device use the biometric feature data to implement network access authentication without a need to perform a complex password setting operation, thereby simplifying an authentication process for accessing a network, and improving network usability and security.

Figure 3A:
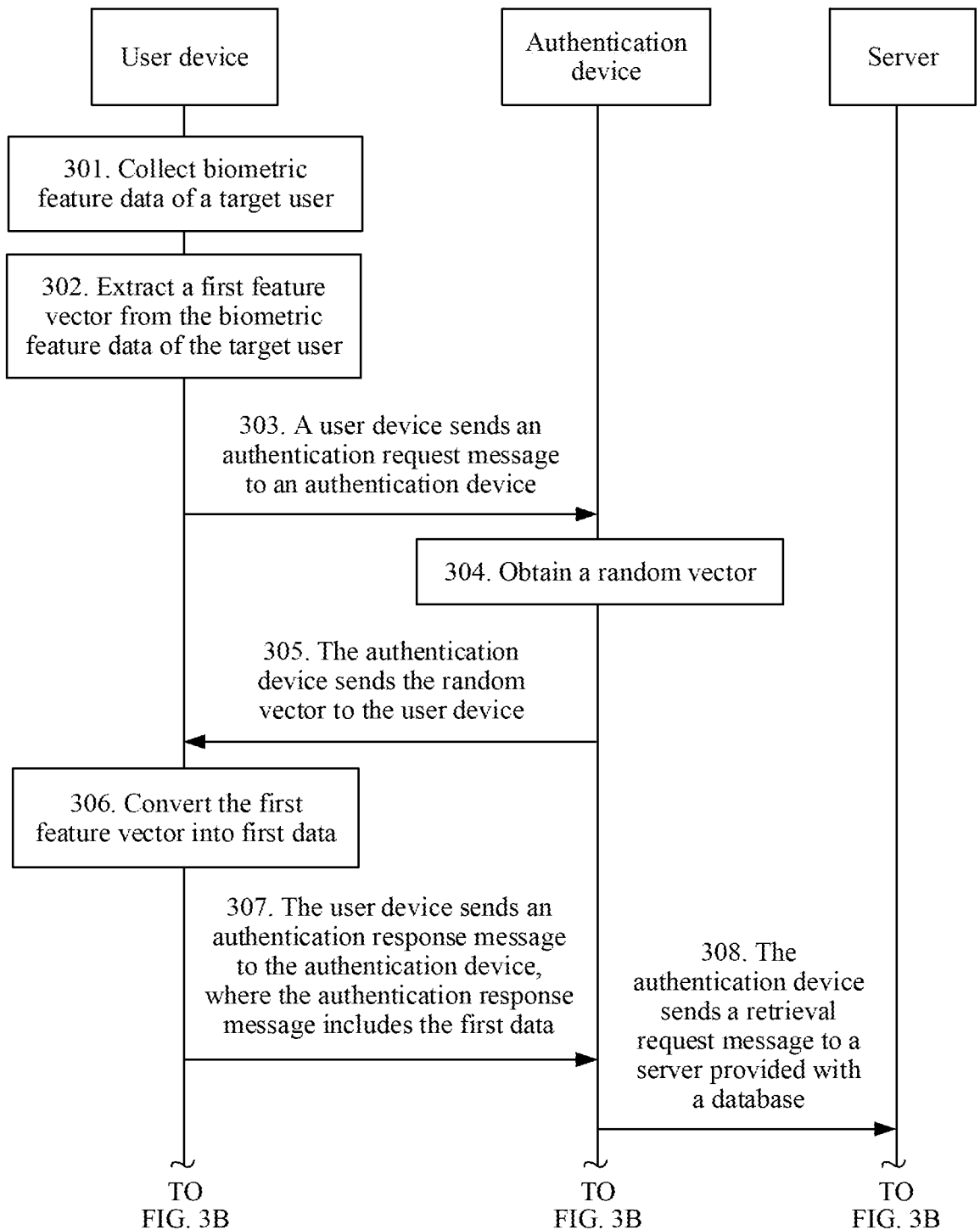
FIG. 3A and FIG. 3B are a flowchart of another authentication method for accessing a network according to an embodiment of this application.
Figure 3B:
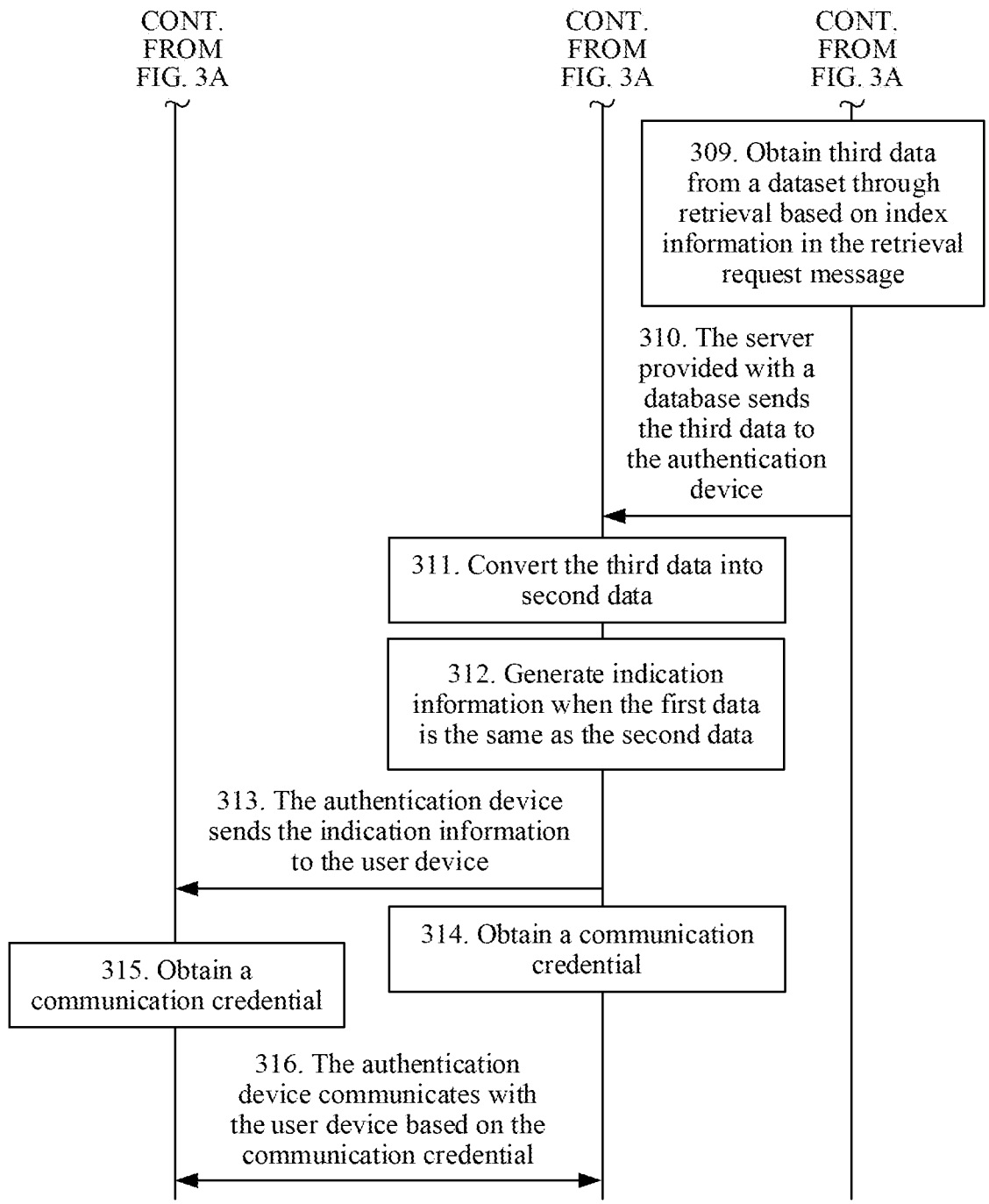

FIG. 3A and FIG. 3B are a flowchart of an authentication method for accessing a network according to an embodiment of this application. The method may be used in the implementation environment shown in FIG. 1. As shown in FIG. 3A and FIG. 3B, the method may include the following steps.

Step 301: A user device collects biometric feature data of a target user.

For a specific method in step 301, refer to the method in step 2011.

Step 302: The user device extracts a first feature vector from the biometric feature data of the target user.

The first feature vector is a specific data form of the target data in step 2012.

For example, the user device obtains a face image of the target user, and extracts a first feature vector from the face image. The first feature vector is represented by C, $$C = \begin{bmatrix} c_{11} & c_{12} & \cdots & c_{1s} \\ c_{21} & c_{22} & \cdots & c_{2s} \\ \vdots & \vdots & \ddots & \vdots \\ c_{m1} & c_{m2} & \cdots & c_{ms} \end{bmatrix},$$

and both m and s are positive integers. The first feature vector may include biometric feature data of a plurality of objects of a face, for example, biometric feature data of an eye, biometric feature data of an eyebrow, biometric feature data of a mouth, and biometric feature data of an ear.

For example, the user device may be triggered by a trigger condition to extract the first feature vector. For a specific trigger condition, refer to the corresponding content in the embodiment corresponding to FIG. 2A.

Step 303: The user device sends an authentication request message to an authentication device.

The authentication request message is used to request the authentication device to send a random vector.

In an implementation, the authentication request message may be carried in an EAP message or a DHCP message.

Step 304: The authentication device obtains a random vector.

In this embodiment of this application, the random vector is denoted as R, and is represented as follows:

$$R = \begin{bmatrix} r_{11} & r_{12} & \cdots & r_{1s} \\ r_{21} & r_{22} & \cdots & r_{2s} \\ \vdots & \vdots & \ddots & \vdots \\ r_{m1} & r_{m2} & \cdots & r_{ms} \end{bmatrix}.$$

Both m and s are positive integers, and $r_{ms}$ is a random number. The random vector R is used to resist a playback attack.

Step 305: The authentication device sends the random vector to the user device.

Each time performing an authentication operation, the user device receives random vectors that are not totally the same and that are sent by the authentication device. Therefore, an attacker cannot complete an authentication process by listening to last information.

Step 306: The user device converts the first feature vector into first data.

The first data in this embodiment of this application is a second feature vector, in other words, the second feature vector is a specific data form of the first data. The second feature vector may be represented as D.

In an implementation, the user device may calculate the first feature vector and the random vector by using a hash function, to obtain the second feature vector D. The second feature vector is D=H[C+R]. H is a group of hash function vectors. The hash function can be used to effectively resist a network listening attack. H may be represented as follows:

$$H[\ ] = \begin{bmatrix} h_{11}() & h_{12}() & \ldots & h_{1s}() \\ h_{21}() & h_{22}() & \ldots & h_{2s}() \\ \vdots & \vdots & \ddots & \vdots \\ h_{m1}() & h_{m2}() & \ldots & h_{ms}() \end{bmatrix}.$$

Both m and s are positive integers, and $h_{ms}$ is a hash function. All $h_{ms}$ in H may be a same hash function or different hash functions. The hash function used by the user device is the same as a hash function used by the authentication device in step 311.

The second feature vector may be represented as follows:

$$D = H[C+R] = \begin{bmatrix} h_1(c_{11}+r_{11}) & h_{12}(c_{12}+r_{12}) & \ldots & h_{1s}(c_{1s}+r_{1s}) \\ h_{21}(c_{21}+r_{21}) & h_{22}(c_{22}+r_{22}) & \ldots & h_{2s}(c_{2s}+r_{2s}) \\ \vdots & \vdots & \ddots & \vdots \\ h_{m1}(c_{m1}+r_{m1}) & h_{m2}(c_{m2}+r_{m2}) & \ldots & h_{ms}(c_{ms}+r_{ms}) \end{bmatrix}.$$

In an implementation, the user device may alternatively directly perform a hash operation on the first feature vector to obtain the second feature vector, in other words, D=H[C].

Step 307: The user device sends an authentication response message to the authentication device, where the authentication response message includes the first data.

For a specific method in step 307, refer to the corresponding content in step 202. The first data in this embodiment of this application is the first feature vector in step 306.

Step 308: The authentication device sends a retrieval request message to a server provided with a database.

The server provided with a database pre-stores a dataset that includes n feature vectors, where n≥1. Each feature vector is determined based on biometric feature data of a user. Each feature vector may carry a user identifier. A method for obtaining the n feature vectors is the same as a method for obtaining the n pieces of data in the embodiment corresponding to FIG. 2A. Details are not described herein. The n feature vectors may be feature vectors obtained by extracting the biometric feature data of the user. The feature vector is denoted as E, and may be represented as follows:

$$E = \begin{bmatrix} e_{11} & e_{12} & \ldots & e_{1t} \\ e_{21} & e_{22} & \ldots & e_{2t} \\ \vdots & \vdots & \ddots & \vdots \\ e_{n1} & e_{n2} & \ldots & e_{nt} \end{bmatrix}.$$

Both n and t are positive integers, n is equal to m, and t is equal to s. The feature vector E may indicate one type of biometric feature data of the user or a plurality of types of biometric feature data of the user.

The authentication response message in step 307 further includes index information. A meaning and a function of the index information are the same as those of the index information in the embodiment corresponding to FIG. 2A. Details are not described herein.

Step 309: The server provided with a database obtains third data from a dataset through retrieval based on index information in the retrieval request message.

The index information corresponds to the third data. The third data in this embodiment of this application is a fourth feature vector, and the fourth feature vector is represented as E.

Step 310: The server provided with a database sends the third data to the authentication device.

Step 311: The authentication device converts the third data into second data.

The second data in this embodiment of this application is a third feature vector, and the third feature vector is represented as F. The authentication device calculates the fourth feature vector and the random vector by using the same hash function as that in step 306, to obtain the third feature vector. The third feature vector is F=H[E+R], and H[ ] is a group of hash function vectors.

$$H[\ ] = \begin{bmatrix} h_{11}() & h_{12}() & \ldots & h_{1t}() \\ h_{21}() & h_{22}() & \ldots & h_{2t}() \\ \vdots & \vdots & \ddots & \vdots \\ h_{n1}() & h_{n2}() & \ldots & h_{nt}() \end{bmatrix},$$

both n and t are positive integers, n is equal to m, and t is equal to s.

$h_{nt}$ is a hash function. All $h_{nt}$ in H may be a same hash function or different hash functions. The hash function used by the authentication device is the same as the hash function used by the user device in step 306, in other words, $h_{nt}$ used by the authentication device is the same as $h_{ms}$ used by the user device. The third feature vector may be represented as follows:

$$F = H[E+R] = \begin{bmatrix} h_1(e_{11}+r_{11}) & h_{12}(e_{12}+r_{12}) & \ldots & h_{1t}(e_{1t}+r_{1t}) \\ h_{21}(e_{21}+r_{21}) & h_{22}(e_{22}+r_{22}) & \ldots & h_{2t}(e_{2t}+r_{2t}) \\ \vdots & \vdots & \ddots & \vdots \\ h_{n1}(e_{n1}+r_{n1}) & h_{n2}(e_{n2}+r_{n2}) & \ldots & h_{nt}(e_{nt}+r_{nt}) \end{bmatrix}.$$

In an implementation, if in step 306, the user device directly performs a hash operation on the first feature vector to obtain the first data, the authentication device may perform a hash operation on the fourth feature vector to obtain the second data.

Step 312: The authentication device generates indication information when the first data is the same as the second data.

The indication information is used to indicate that the user device is authenticated. The second feature vector is the same as the third feature vector, that is, $$h_{ms}(c_{ms}+r_{ms})=h_{nt}(e_{nt}+r_{nt}).$$

Step 313: The authentication device sends the indication information to the user device.

Step 314: The authentication device obtains a communication credential.

Step 315: The user device obtains a communication credential.

The communication credentials obtained by the authentication device and the user equipment may be communication passwords or communication keys.

In an implementation, the authentication device converts the fourth feature vector into the communication credential in a first conversion manner, and the user device converts the first feature vector into the communication credential in the first conversion manner. In other words, a conversion manner in which the user device converts the first feature vector is the same as a conversion manner in which the authentication device converts the fourth feature vector. This process is applicable to a symmetric key encryption scenario.

First feature vector $$C = \begin{bmatrix} c_{11} & c_{12} & \cdots & c_{1s} \\ c_{21} & c_{22} & \cdots & c_{2s} \\ \vdots & \vdots & \ddots & \vdots \\ c_{m1} & c_{m2} & \cdots & c_{ms} \end{bmatrix} = \text{Fourth}$$

feature vector $$E = \begin{bmatrix} e_{11} & e_{12} & \cdots & e_{1t} \\ e_{21} & e_{22} & \cdots & e_{2t} \\ \vdots & \vdots & \ddots & \vdots \\ e_{n1} & e_{n2} & \cdots & e_{nt} \end{bmatrix}.$$

For example, the first conversion manner may include the following several manners: 1. The user device may use, as a communication key, an element $c_{ij}$ that is in an $i^{th}$ ($1 \leq i \leq m$) row and a $j^{th}$ ($1 \leq j \leq s$) column in the first feature vector C, and the authentication device also uses, as a communication key, an element $e_{ij}$ that is in an $i^{th}$ row and a $j^{th}$ column in the fourth feature vector E. 2. The user device may use a sum of all elements in the first feature vector C as the communication key, and the authentication device uses a sum of all elements in the fourth feature vector E as the communication key. 3. The user device may use, as the communication key, m pieces of data including a zeroth bit of data (each element in the first feature vector C includes at least one bit of data) in $c_{11}$ in the first feature vector C, a second bit of data in $c_{22}$ in the first feature vector C, a third bit of data in $c_{33}$ in the first feature vector C, . . . , and an $m^{th}$ bit of data in $c_{ms}$ in the first feature vector C, and the authentication device uses, as the communication key, n pieces of data including a zeroth bit of data (each element in the fourth feature vector E includes at least one bit of data) in $e_{11}$ in the fourth feature vector E, a second bit of data in $e_{22}$ in the fourth feature vector E, a third bit of data in $e_{33}$ in the fourth feature vector E, . . . , and an $n^{th}$ bit of data in $e_{nt}$ in the fourth feature vector E.

Alternatively, when the biometric feature data is physiological data, the first feature vector C includes a reference value and an offset from an actual value to the reference value, and the fourth feature vector E includes a reference value and an offset from an actual value to the reference value. In this case, the user device and the authentication device may use the reference value as a communication key. Alternatively, the user device and the authentication device may perform a same operation on a reference value to obtain a communication key. For example, the user device and the authentication device superimpose a value on the reference value, or the user device and the authentication device perform a shift operation on the reference value. For example, an original reference value 011 is shifted leftward by one bit to obtain 110.

In an implementation, the authentication device converts the fourth feature vector into the communication credential in a first conversion manner, and the user device converts the first feature vector into the communication credential in a second conversion manner. The second conversion manner is different from the first conversion manner. In other words, a conversion manner in which the user device converts the first feature vector is different from a conversion manner in which the authentication device converts the fourth feature vector. This process is applicable to an asymmetric key encryption scenario. For details, refer to the corresponding content in the embodiment corresponding to FIG. 2A.

Step 316: The authentication device communicates with the user device based on the communication credential.

In this embodiment of this application, when the authentication device does not have a function of a gateway device, after obtaining the communication credential, the authentication device may further send the communication credential to a gateway device such as a home gateway, an access gateway (for example, an enterprise gateway), an IoT gateway, an access device, or an IP edge device, so that the user device communicates with the gateway device based on the communication credential.

Figure 4A:
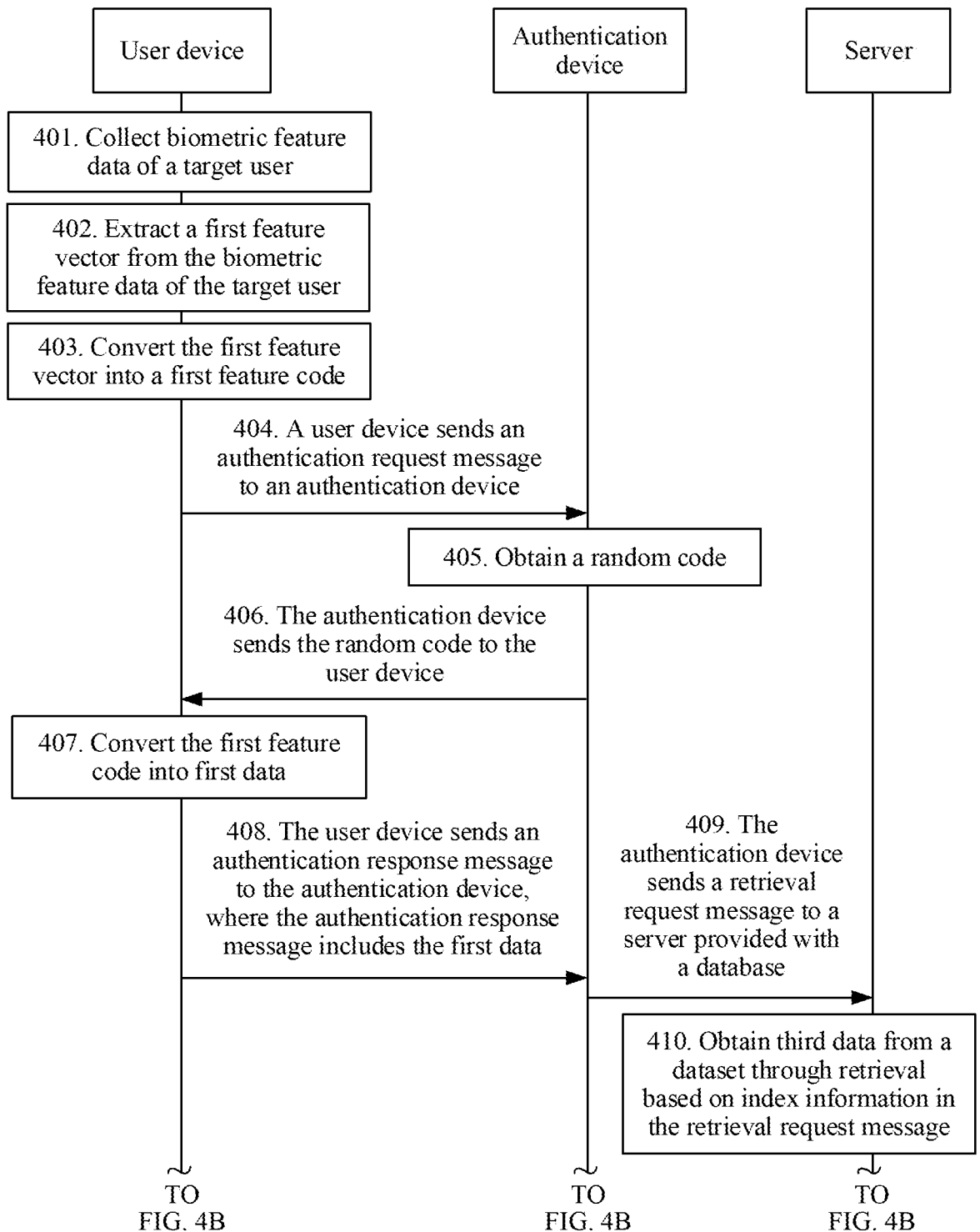
FIG. 4A and FIG. 4B are a flowchart of still another authentication method for accessing a network according to an embodiment of this application.
Figure 4B:
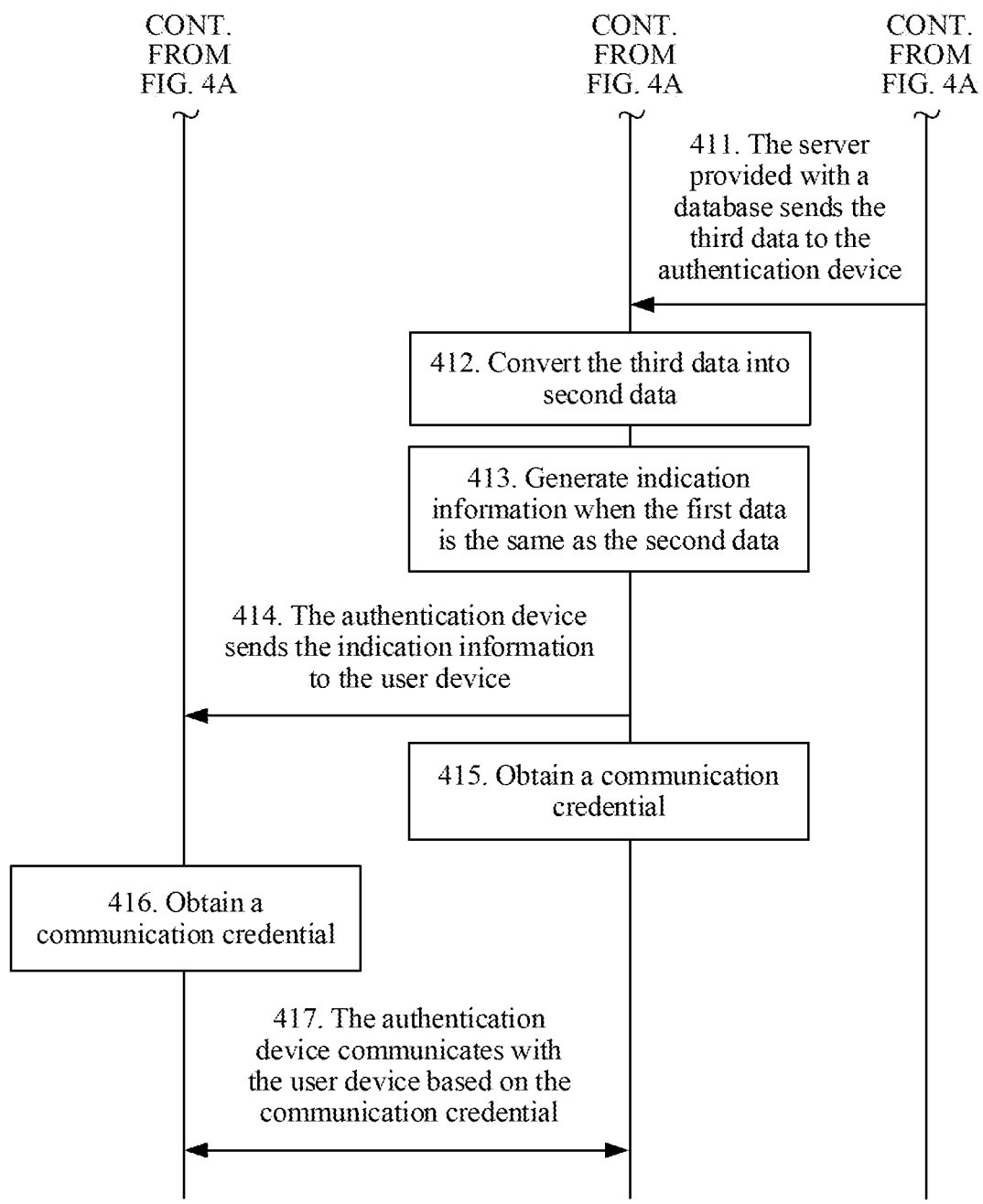

FIG. 4A and FIG. 4B are a flowchart of an authentication method for accessing a network according to an embodiment of this application. The method may be used in the implementation environment shown in FIG. 1. As shown in FIG. 4A and FIG. 4B, the method may include the following steps.

Step 401: A user device collects biometric feature data of a target user.

Step 402: The user device extracts a first feature vector from the biometric feature data of the target user.

For step 401 and step 402, refer to the corresponding content in step 301 and step 302.

Step 403: The user device converts the first feature vector into a first feature code.

For example, the first feature code is the target data in step 2012. The first feature code is a value. For example, the user device may add up all elements in the first feature vector to obtain the first feature code, or may perform another type of operation on all elements in the first feature vector to obtain the first feature code. Alternatively, the user device may convert the first feature vector into the first feature code by using an RSA algorithm.

Step 404: The user device sends an authentication request message to an authentication device.

The authentication request message is used to request the authentication device to send a random code.

In an implementation, the authentication request message may be carried in an EAP message or a DHCP message.

Step 405: The authentication device obtains a random code.

Step 406: The authentication device sends the random code to the user device.

Each time performing an authentication operation, the user device receives different random codes sent by the authentication device. Therefore, an attacker cannot complete an authentication process by listening to last information.

Step 407: The user device converts the first feature code into first data.

The first data in this embodiment of this application is a second feature code. In an implementation, the user device may calculate the first feature code and the random code in step 405 by using a hash function, to obtain the second feature code. For details, refer to step 306. In another implementation, the user device may directly perform a hash operation on the first feature code to obtain the second feature code.

Step 408: The user device sends an authentication response message to the authentication device, where the authentication response message includes the first data.

Optionally, the authentication response message further includes index information. The index information is the same as the index information in the embodiment corresponding to FIG. 2A.

Step 409: The authentication device sends a retrieval request message to a server provided with a database.

The server provided with a database pre-stores n feature codes, and each feature code is obtained after the server provided with a database converts a feature vector. A conversion manner is the same as a conversion manner in which the user device converts the first feature vector into the first feature code in step 403. Details are not described herein. Each feature code is a value, and each feature code may carry a user identifier. When a user performs Internet access registration or a user goes to an operator's business office (or a corresponding website) to open an account, biometric feature data of the user may be collected by using a collection device, to obtain the n feature codes. For details, refer to the related description in step 308.

If the authentication response message includes the index information, the retrieval request message includes the index information.

Step 410: The server provided with a database obtains third data from a dataset through retrieval based on index information in the retrieval request message.

The index information corresponds to the third data. The third data in this embodiment of this application is a fourth feature code.

Step 411: The server provided with a database sends the third data to the authentication device.

Step 412: The authentication device converts the third data into second data.

The second data in this embodiment of this application is a third feature code. The authentication device converts the fourth feature code into the third feature code. The authentication device calculates the fourth feature code and the random code in step 405 by using the same hash function (or a matched hash function) as that in step 407, to obtain the third feature code. For a specific process in step 412, refer to step 311.

Optionally, in step 407, if the user device performs a hash operation on the first feature code to obtain the second feature code, in this step, the authentication device performs a hash operation on the fourth feature code to obtain the third feature code.

Step 413: The authentication device generates indication information when the first data is the same as the second data.

The indication information is used to indicate that the user device is authenticated.

Step 414: The authentication device sends the indication information to the user device.

Step 415: The authentication device obtains a communication credential.

For example, the authentication device may directly use the first feature code in step 403 as the communication credential.

Step 416: The user device obtains a communication credential.

For example, the user device may directly use the fourth feature code in step 410 as the communication credential.

The communication credentials used by the authentication device and the user device may be communication passwords or communication keys.

Step 417: The authentication device communicates with the user device based on the communication credential.

In this embodiment of this application, when the authentication device does not have a function of a gateway device, after obtaining the communication credential, the authentication device may further send the communication credential to a gateway device such as a home gateway, an access gateway (for example, an enterprise gateway), an IoT gateway, an access device, or an IP edge device, so that the user device communicates with the gateway device based on the communication credential.

An apparatus embodiment of this application is provided below, and an apparatus may be configured to perform the method embodiment of this application. For details not disclosed in the apparatus embodiment of this application, refer to the method embodiment of this application.

Figure 5A:
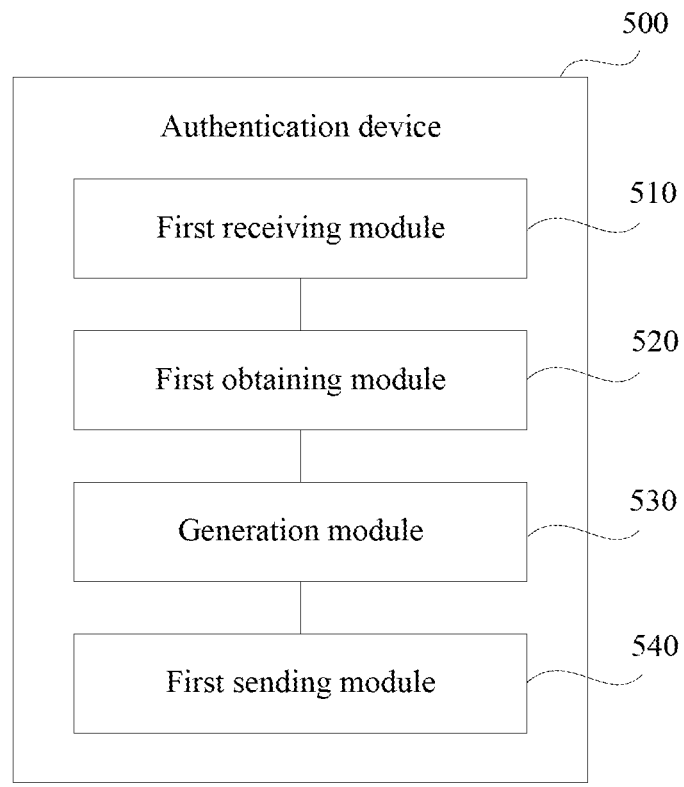
FIG. 5A is a schematic structural diagram of an authentication device according to an embodiment of this application.

FIG. 5A is a schematic structural diagram of an authentication device 500 according to an embodiment of this application. The authentication device 500 may be applied to the authentication device in the implementation environment shown in FIG. 1. As shown in FIG. 5A, the authentication device 500 includes:

a first receiving module 510, configured to receive an authentication response message sent by a user device, where the authentication response message includes first data, and the first data is data obtained by the user device based on biometric feature data of a target user;

a first obtaining module 520, configured to implement step 203 in the foregoing embodiment and another function of explicitly or implicitly obtaining the second data in the foregoing method embodiment;

a generation module 530, configured to implement step 204, step 312, or step 413 in the foregoing embodiment; and a first sending module 540, configured to implement step 205, step 313, or step 414 in the foregoing embodiment.

Figure 5B:
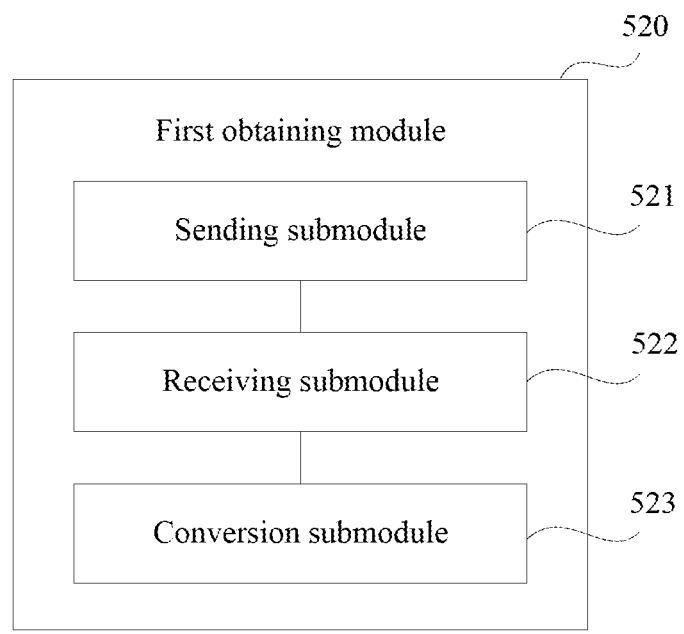
FIG. 5B is a schematic structural diagram of a first obtaining module according to an embodiment of this application.

Optionally, the authentication response message further includes index information. Correspondingly, as shown in FIG. 5B, the first obtaining module 520 includes:

a sending submodule 521, configured to implement step 2031, step 308, or step 409 in the foregoing embodiment;

a receiving submodule 522, configured to receive third data sent by a server provided with a database, where the third data is stored biometric feature data of a user that is obtained, based on the index information, by the server provided with a database; and a conversion submodule 523, configured to implement step 2033 in the foregoing embodiment and another function of explicitly or implicitly converting the third data in the foregoing method embodiment.

Figure 5C:
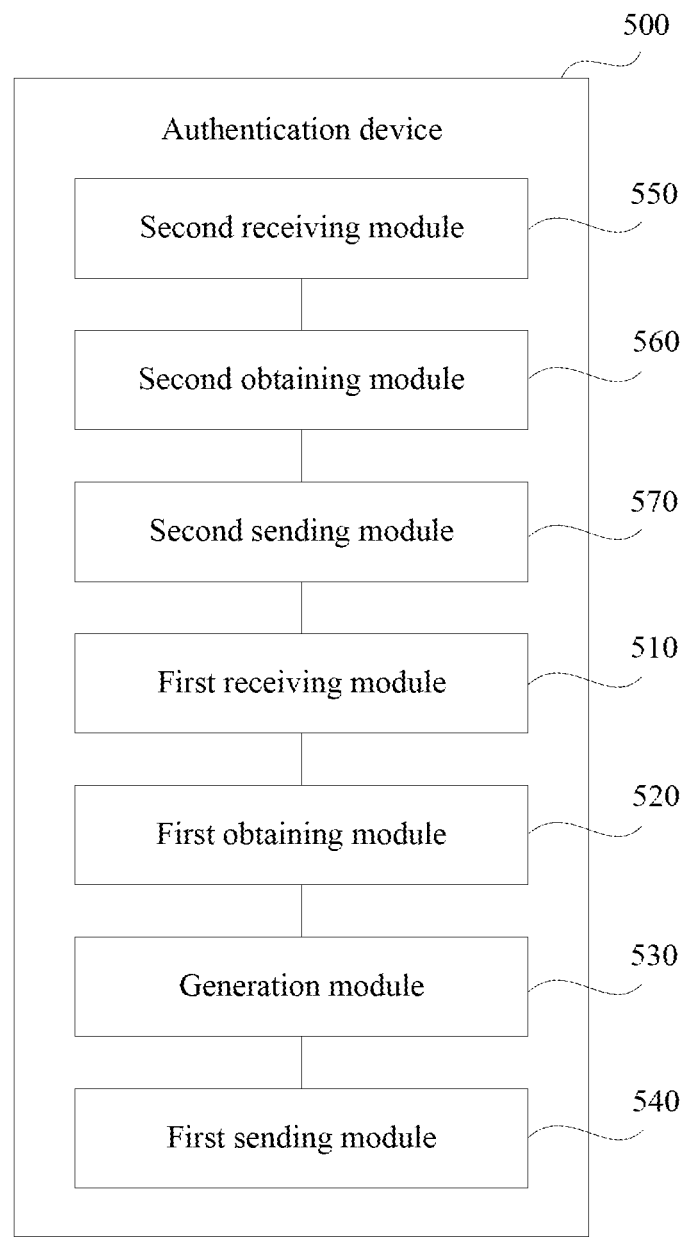
FIG. 5C is a schematic structural diagram of another authentication device according to an embodiment of this application.

Further, as shown in FIG. 5C, the authentication device 500 may further include:

a second receiving module 550, configured to receive an authentication request message sent by the user device, where the authentication request message is used to request the authentication device 500 to send random data;

a second obtaining module 560, configured to implement step 2014, step 304, or step 405 in the foregoing embodiment; and a second sending module 570, configured to implement step 2015, step 305, or step 406 in the foregoing embodiment.

The conversion submodule 523 is configured to:

calculate the third data and the random data by using a hash function, to obtain the second data.

For meanings of other marks in FIG. 5C, refer to FIG. 5A.

Optionally, the first data is a first feature vector, the second data is the third data, the third data is a second feature vector, the first feature vector is a feature vector obtained by the user device based on the biometric feature data of the target user, and the second feature vector is a feature vector obtained by the server based on the biometric feature data of the user.

Alternatively, the first data is a first feature code, the second data is the third data, the third data is a second feature code, the first feature code is a feature code obtained after the user device converts a first feature vector, the first feature vector is a feature vector obtained by the user device based on the biometric feature data of the target user, the second feature code is a feature code obtained after the server converts a second feature vector, and the second feature vector is a feature vector obtained by the server based on the biometric feature data of the user.

Alternatively, the first data is a second feature vector, the second data is a third feature vector, the third data is a fourth feature vector, the random data is a random vector, the second feature vector is a feature vector obtained by calculating a first feature vector and the random vector by using a hash function, the third feature vector is a feature vector obtained by the user device based on the biometric feature data of the target user, and the fourth feature vector is a feature vector obtained by the server based on the biometric feature data of the user.

Alternatively, the first data is a second feature code, the second data is a third feature code, the third data is a fourth feature code, the random data is a random code, the second feature code is a feature code obtained by calculating a first feature code and the random code by using a hash function, the third feature code is a feature code obtained after the user device converts a first feature vector, the first feature vector is a feature vector obtained by the user device based on the biometric feature data of the target user, the fourth feature code is a feature code obtained after the server converts a second feature vector, and the second feature vector is a feature vector obtained by the server based on the biometric feature data of the user.

The authentication device 500 provided in this embodiment of this application performs authentication on the user device based on the biometric feature data without a need to perform a complex password setting operation, thereby simplifying an authentication process for accessing a network, and improving network usability and security.

Figure 6A:
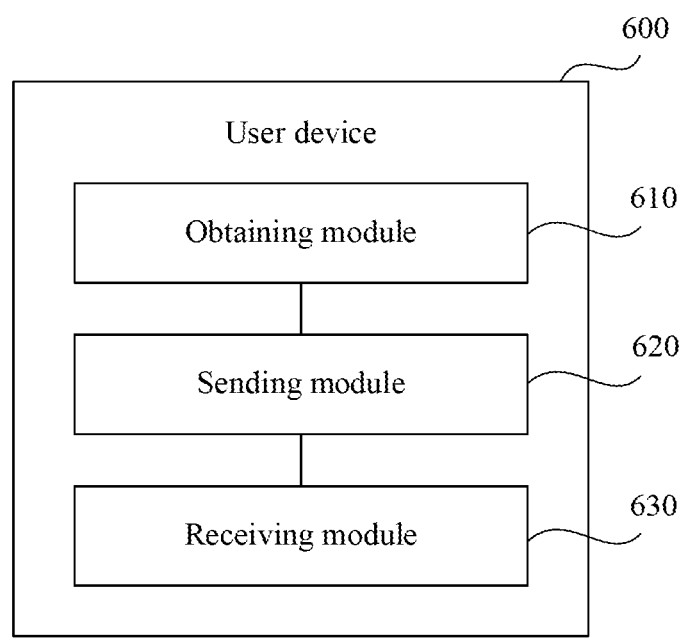
FIG. 6A is a schematic structural diagram of a user device according to an embodiment of this application.

FIG. 6A is a schematic structural diagram of a user device 600 according to an embodiment of this application. The user device 600 may be applied to the user device in the implementation environment shown in FIG. 1. As shown in FIG. 6A, the user device 600 includes:

an obtaining module 610, configured to implement step 201 in the foregoing embodiment and another function of explicitly or implicitly obtaining the first data in the foregoing method embodiment;

a sending module 620, configured to implement step 202, step 307, or step 408 in the foregoing embodiment; and a receiving module 630, configured to receive indication information sent by the authentication device, where the indication information is used to indicate that the user device 600 is authenticated.

Figure 6B:
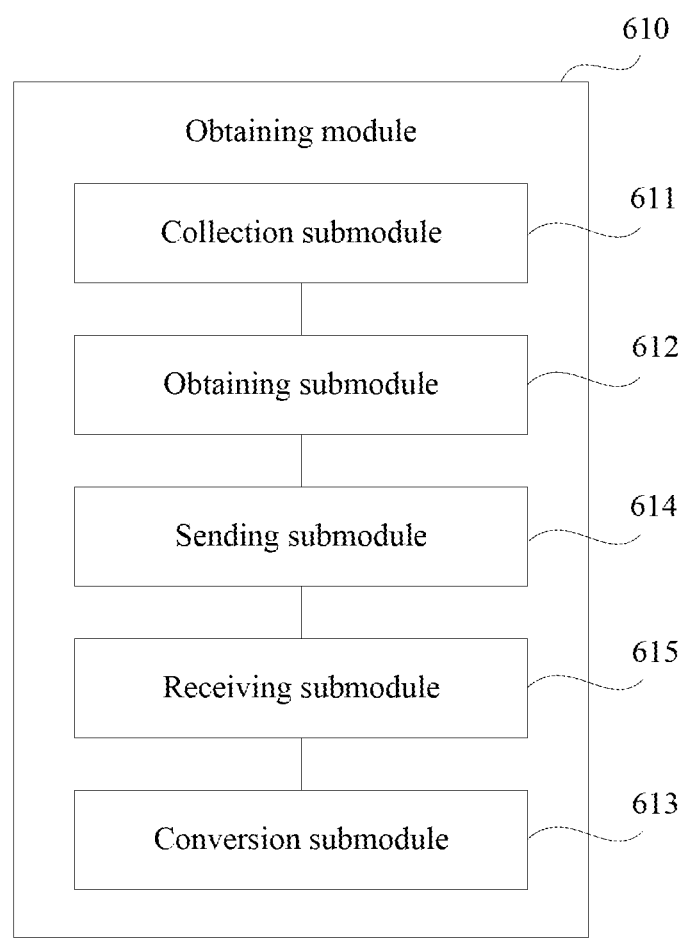
FIG. 6B is a schematic structural diagram of an obtaining module according to an embodiment of this application.

Optionally, as shown in FIG. 6B, the obtaining module 610 includes:

a collection submodule 611, configured to implement step 2011, step 301, or step 401 in the foregoing embodiment;

an obtaining submodule 612, configured to implement step 2012 in the foregoing embodiment and another function of explicitly or implicitly obtaining the target data in the foregoing method embodiment: and a conversion submodule 613, configured to implement step 2016 in the foregoing embodiment and another function of explicitly or implicitly converting the target data in the foregoing method embodiment.

Further, as shown in FIG. 6B, the obtaining module 610 may further include:

a sending submodule 614, configured to implement step 2013, step 303, or step 404 in the foregoing embodiment: and a receiving submodule 615, configured to receive random data sent by the authentication device.

The conversion submodule 613 is configured to calculate the target data and the random data by using a hash function, to obtain the first data.

Optionally, the first data is the target data, the target data is a first feature vector, and the first feature vector is a feature vector obtained by the user device 600 based on the biometric feature data of the target user.

Alternatively, the first data is the target data, the target data is a first feature code, the first feature code is a feature code obtained after the user device 600 converts a first feature vector, and the first feature vector is a feature vector obtained by the user device 600 based on the biometric feature data of the target user.

Optionally, the first data is a second feature vector, the target data is a first feature vector, the random data is a random vector, and the first feature vector is a feature vector obtained by the user device 600 based on the biometric feature data of the target user.

Alternatively, the first data is a second feature code, the target data is a first feature code, the first feature code is a feature code obtained after the user device 600 converts a first feature vector, and the first feature vector is a feature vector obtained by the user device 600 based on the biometric feature data of the target user.

Figure 7:
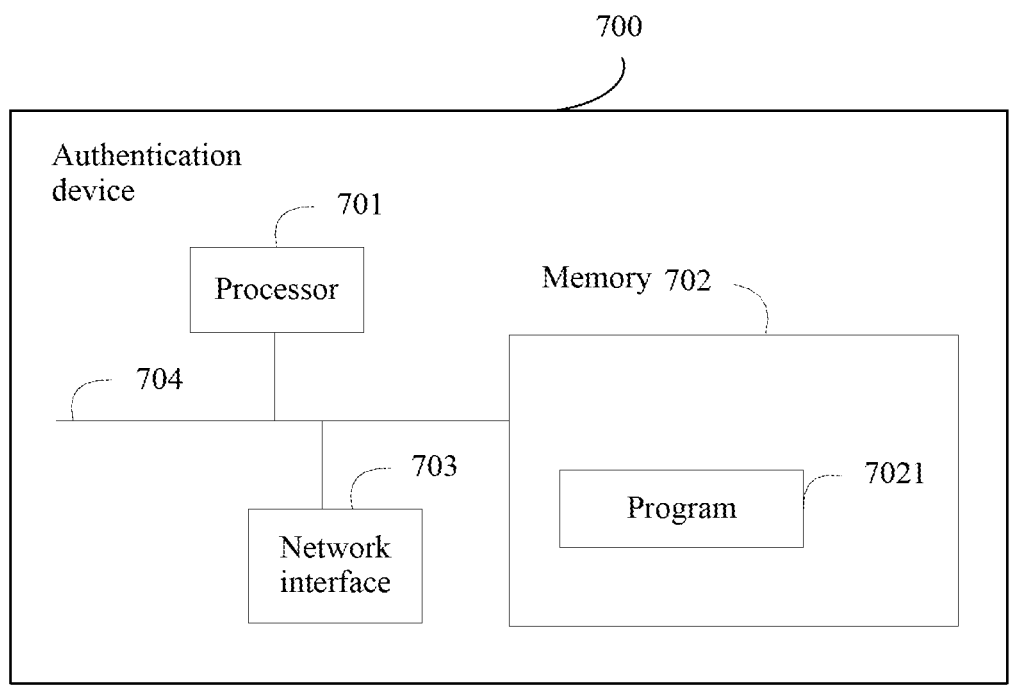
FIG. 7 is a schematic structural diagram of an authentication device according to an embodiment of this application.

FIG. 7 is a schematic structural diagram of an authentication device 700 according to an embodiment of this application. The authentication device 700 may be applied to the authentication device in the implementation environment shown in FIG. 1. Each component shown in FIG. 7 may be implemented in hardware that includes one or more signal processors and/or application-specific integrated circuits, in software, or in a combination of hardware and software. The authentication device 700 shown in FIG. 7 is used as an example for specific description. As shown in FIG. 7, the authentication device 700 includes a processor 701 (for example, a central processing unit (CPU)), a memory 702, a network interface 703, and a bus 704. The bus 704 is configured to connect the processor 701, the memory 702, and the network interface 703. The memory 702 may include a random access memory (RAM), or may include a nonvolatile memory (nonvolatile memory), for example, at least one magnetic disk memory. A communication connection between the authentication device 700 and a user device is implemented by using the network interface 703 (which may be wired or wireless). The memory 702 stores a program 7021. The program 7021 is used to implement various application functions. The processor 701 is configured to execute the program 7021 stored in the memory 702 to implement, through cooperation, the authentication method for accessing a network shown in FIG. 2A, FIG. 3A and FIG. 3B, or FIG. 4A and FIG. 4B.

The authentication device 700 provided in this embodiment of this application implements, in cooperation with the foregoing execution modules, the functions completed by the authentication device 500 in the apparatus embodiment shown in FIG. 5A or FIG. 5C. The first receiving module 510 in FIG. 5A in the foregoing description may be implemented by the network interface 703. The generation module 530 in FIG. 5A may be implemented by the processor 701 by executing the program 7021 stored in the memory 702.

Figure 8:
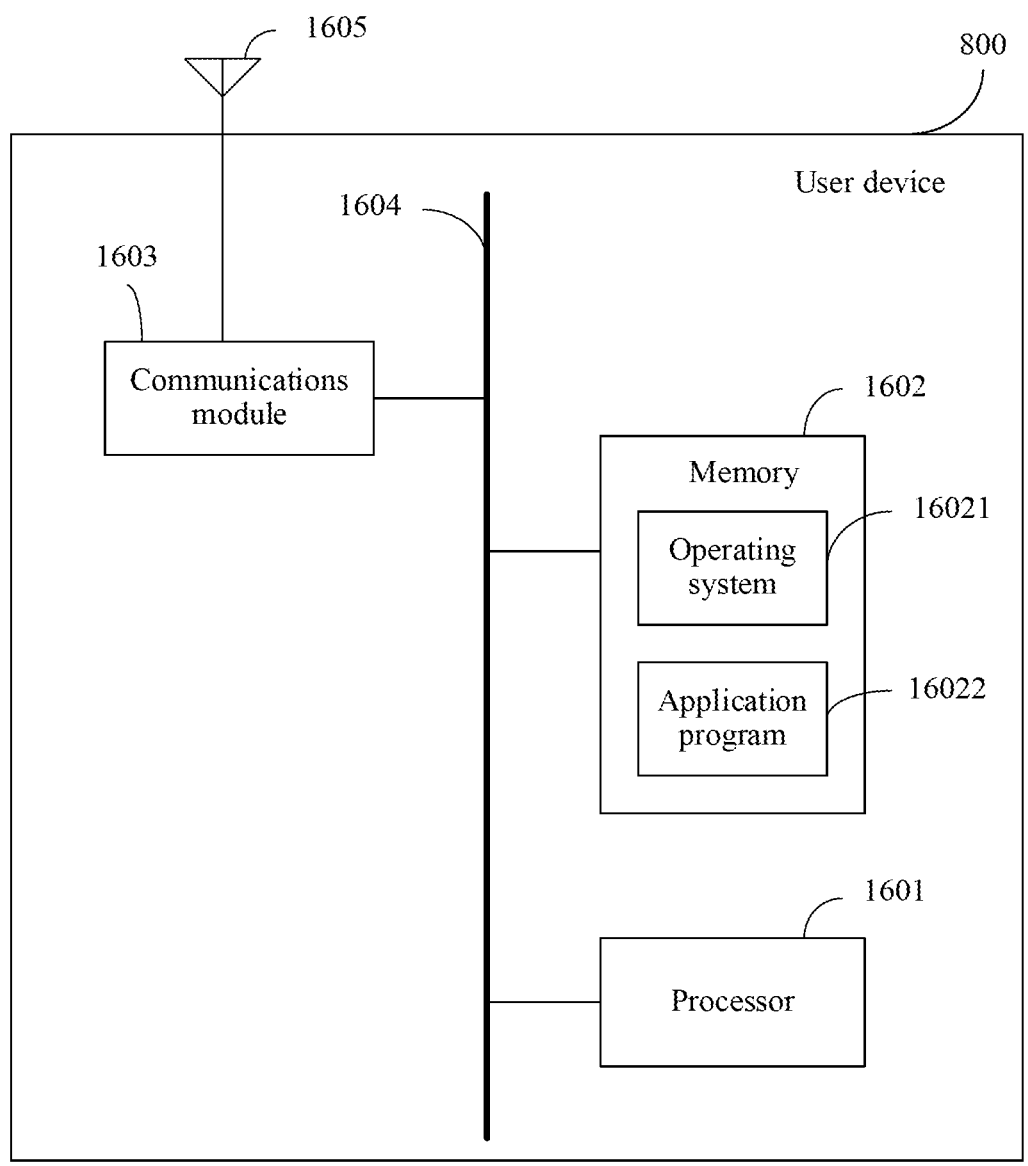
FIG. 8 is a schematic structural diagram of a user device according to an embodiment of this application.

FIG. 8 is a schematic structural diagram of a user device 800 according to an embodiment of this application. The user device 800 may be applied to the user device in the implementation environment shown in FIG. 1. It should be understood that the user device may include more or fewer components than those shown in FIG. 8, may combine two or more components, or may have different component configurations. Each component shown in FIG. 8 may be implemented in hardware that includes one or more signal processors and/or application-specific integrated circuits, in software, or in a combination of hardware and software. The user device 800 shown in FIG. 8 is used as an example for specific description. As shown in FIG. 8, the user device 800 includes at least one processor 1601, a memory 1602, a communications module 1603, and a communications bus 1604. Optionally, the user device 800 further includes an antenna 1605. The user device 800 further includes another function component, such as a battery module and a wired/wireless charging structure. The communications bus 1604 is configured to implement connection and communication between these components. The memory 1602 may include a non-volatile solid-state memory and/or a dynamic non-volatile storage device, such as a flash memory and a rotatable disk drive. The communications module 1603 may be used for communication, and the communications module 1603 may be a communications interface. The antenna 1605 is configured to receive and transmit a radio signal. The antenna 1605 may cooperate with the communications module 1603 to implement signal receiving/transmitting in Wi-Fi, CDMA, a 4G technology, a 5G technology, and the like.

Specifically, the memory 1602 includes an operating system 16021 and an application program 16022. The operating system 16021 includes various operating system programs for implementing various hardware-based operations. The application program 16022 includes various application programs for implementing various application functions, for example, a first data determining program. The first data determining program enables the user device 800 to obtain first data based on biometric feature data of a target user. The processor 1601 communicates with each module and component by using the communications bus 1604. The processor 1601 may execute the application program 16022 stored in the memory 1602 to implement, through cooperation, the authentication method for accessing a network shown in FIG. 2A, FIG. 3A and FIG. 3B, or FIG. 4A and FIG. 4B.

The user device 800 provided in this embodiment of this application implements, in cooperation with the foregoing execution modules, the functions completed by the user device 600 in the apparatus embodiment shown in FIG. 6A. The obtaining module 610 in FIG. 6A in the foregoing description may be implemented by the processor 1601 by executing the application program 16022 stored in the memory 1602. The sending module 620 and the receiving module 630 in FIG. 6A may be implemented by the communications module 1603 and the antenna 1605.

An embodiment of this application further provides an Internet access authentication system, including an authentication device and a user device. The authentication device 500 is the authentication device shown in FIG. 5A or FIG. 5C, and the user device is the user device 600 shown in FIG. 6A.

An embodiment of this application further provides an Internet access authentication system, including an authentication device and a user device. The authentication device is the authentication device 700 shown in FIG. 7, and the user device is the user device 800 shown in FIG. 8.

It may be clearly understood by a person skilled in the art that for the purpose of convenient and brief description, for a detailed working process of the foregoing system, device, and module, refer to a corresponding process in the foregoing method embodiments, and details are not described herein again.

All or some of the foregoing embodiments may be implemented by using software, hardware, firmware, or any combination thereof. When the foregoing embodiments are implemented by using software, the embodiments may be all or partially implemented in a form of a computer program product. The computer program product includes one or more computer instructions. When the computer program instructions are loaded and executed on a computer, the procedures or functions according to the embodiments of this application are all or partially generated. The computer may be a general-purpose computer, a computer network, or another programmable apparatus. The computer instructions may be stored in a computer readable storage medium or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, wireless, or microwave) manner. The computer readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium, a semiconductor medium (for example, a solid state drive), or the like.

In the several embodiments provided in this application, it should be understood that the disclosed device and method may be implemented in another manner. For example, the described apparatus embodiment is merely an example. For example, the module division is merely logical function division. There may be another division manner during actual implementation. For example, a plurality of modules or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

A person of ordinary skill in the art may understand that all or some of the steps of the embodiments may be implemented by hardware or a program instructing related hardware. The program may be stored in a computer readable storage medium. The storage medium may be a read-only memory, a magnetic disk, an optical disc, or the like. The foregoing descriptions are merely optional embodiments of this application, but are not intended to limit this application. Any modification, equivalent replacement, improvement, or the like made without departing from the spirit and principle of this application should fall within the protection scope of this application.

What is claimed is:

1. An authentication method for accessing a network, applied to an authentication device, wherein the method comprises:

receiving an authentication response message sent by a user device, wherein the authentication response message comprises a first data, and the first data is data obtained by the user device based on a biometric feature data of a target user;

obtaining a second data from a server, wherein the second data is data obtained by the server based on a biometric feature data of a user;

generating an indication information when the first data is the same as the second data, wherein the indication information is used to indicate that the user device is authenticated; and sending the indication information to the user device, wherein the authentication response message further comprises index information, the index information being configured to identify the user device or the target user, wherein the obtaining second data from the server comprises:

sending a retrieval request message to the server, wherein the retrieval request message comprises the index information;

receiving third data sent by the server, wherein the third data is a stored biometric feature data of the user that is obtained by the server based on the index information; and converting the third data into the second data, and wherein before the receiving the authentication response message sent by the user device, the method further comprises:

receiving an authentication request message sent by the user device, wherein the authentication request message is used to request the authentication device to send a random data;

obtaining the random data; and sending the random data to the user device; and the converting the third data into the second data comprises:

calculating the third data and the random data by using a hash function, to obtain the second data.

2. The method according to claim 1, wherein the first data is a first feature vector, the second data is the third data, the third data is a second feature vector, the first feature vector is a feature vector obtained by the user device based on the biometric feature data of the target user, and the second feature vector is a feature vector obtained by the server based on the biometric feature data of the user; or the first data is a first feature code, the second data is the third data, the third data is a second feature code, the first feature code is a feature code obtained after the user device converts a first feature vector, the first feature vector is a feature vector obtained by the user device based on the biometric feature data of the target user, the second feature code is a feature code obtained after the server converts a second feature vector, and the second feature vector is a feature vector obtained by the server based on the biometric feature data of the user.

3. The method according to claim 1, wherein the first data is a second feature vector, the second data is a third feature vector, the third data is a fourth feature vector, the random data is a random vector, the second feature vector is a feature vector obtained by calculating a first feature vector and the random vector by using a hash function, the third feature vector is a feature vector obtained by the user device based on the biometric feature data of the target user, and the fourth feature vector is a feature vector obtained by the server based on the biometric feature data of the user; or the first data is a second feature code, the second data is a third feature code, the third data is a fourth feature code, the random data is a random code, the second feature code is a feature code obtained by calculating a first feature code and the random code by using a hash function, the third feature code is a feature code obtained after the user device converts a first feature vector, the first feature vector is a feature vector obtained by the user device based on the biometric feature data of the target user, the fourth feature code is a feature code obtained after the server converts a second feature vector, and the second feature vector is a feature vector obtained by the server based on the biometric feature data of the user.

4. An authentication method for accessing a network, applied to a user device, wherein the method comprises:

obtaining first data based on biometric feature data of a target user, wherein the first data is data obtained by the user device based on the data obtained by preprocessing a biometric feature of the target user;

sending an authentication response message to an authentication device, wherein the authentication response message comprises the first data; and receiving indication information sent by the authentication device, wherein the indication information is used to indicate that the user device is authenticated, wherein the authentication response message further comprises index information, the index information being configured to identify the user device or the target user, wherein the obtaining the first data based on the biometric feature data of the target user comprises:

collecting the biometric feature data of the target user;

obtaining target data based on the biometric feature data of the target user, wherein the target data is the data obtained by preprocessing the biometric feature of the target user; and converting the target data into the first data, and wherein before the converting the target data into the first data, the method further comprises:

sending an authentication request message to the authentication device, wherein the authentication request message is used to request the authentication device to send a random data; and receiving the random data sent by the authentication device; and the converting the target data into the first data comprises:

calculating the target data and the random data by using a hash function, to obtain the first data.

5. The method according to claim 4, wherein the first data is the target data, the target data is a first feature vector, and the first feature vector is a feature vector obtained by the user device based on the biometric feature data of the target user; or the first data is the target data, the target data is a first feature code, the first feature code is a feature code obtained after the user device converts a first feature vector, and the first feature vector is a feature vector obtained by the user device based on the biometric feature data of the target user.

6. The method according to claim 4, wherein the first data is a second feature vector, the target data is a first feature vector, the random data is a random vector, and the first feature vector is a feature vector obtained by the user device based on the biometric feature data of the target user; or the first data is a second feature code, the target data is a first feature code, the first feature code is a feature code obtained after the user device converts a first feature vector, and the first feature vector is a feature vector obtained by the user device based on the biometric feature data of the target user.

7. An authentication device, wherein the authentication device comprises:
a processor; and
a non-transitory computer-readable storage medium coupled to the processor and storing programming instructions for execution by the processor, the programming instructions instruct the processor to:
receive an authentication response message sent by a user device, wherein the authentication response message comprises first data, and the first data is data obtained by the user device based on biometric feature data of a target user;
obtain second data from a server, wherein the second data is data obtained by the server based on biometric feature data of a user;
generate indication information when the first data is the same as the second data, wherein the indication information is used to indicate that the user device is authenticated; and
send the indication information to the user device,
wherein the authentication response message further comprises index information, the index information being configured to identify the user device or the target user,
wherein the programming instructions instruct the processor to:
send a retrieval request message to the server, wherein the retrieval request message comprises the index information;
receive third data sent by the server, wherein the third data is stored biometric feature data of the user that is obtained by the server based on the index information; and
convert the third data into the second data, and
wherein the programming instructions further instruct the processor to:
receive an authentication request message sent by the user device, wherein the authentication request message is used to request the authentication device to send a random data;
obtain the random data; and
send the random data to the user device; and
wherein the programming instructions instruct the processor to:

calculate the third data and the random data by using a hash function, to obtain the second data.

8. The authentication device according to claim 7, wherein the first data is a first feature vector, the second data is the third data, the third data is a second feature vector, the first feature vector is a feature vector obtained by the user device based on the biometric feature data of the target user, and the second feature vector is a feature vector obtained by the server based on the biometric feature data of the user; or the first data is a first feature code, the second data is the third data, the third data is a second feature code, the first feature code is a feature code obtained after the user device converts a first feature vector, the first feature vector is a feature vector obtained by the user device based on the biometric feature data of the target user, the second feature code is a feature code obtained after the server converts a second feature vector, and the second feature vector is a feature vector obtained by the server based on the biometric feature data of the user.

9. The authentication device according to claim 7, wherein the first data is a second feature vector, the second data is a third feature vector, the third data is a fourth feature vector, the random data is a random vector, the second feature vector is a feature vector obtained by calculating a first feature vector and the random vector by using a hash function, the third feature vector is a feature vector obtained by the user device based on the biometric feature data of the target user, and the fourth feature vector is a feature vector obtained by the server based on the biometric feature data of the user; or the first data is a second feature code, the second data is a third feature code, the third data is a fourth feature code, the random data is a random code, the second feature code is a feature code obtained by calculating a first feature code and the random code by using a hash function, the third feature code is a feature code obtained after the user device converts a first feature vector, the first feature vector is a feature vector obtained by the user device based on the biometric feature data of the target user, the fourth feature code is a feature code obtained after the server converts a second feature vector, and the second feature vector is a feature vector obtained by the server based on the biometric feature data of the user.

10. A user device, wherein the user device comprises:
a processor; and
a non-transitory computer-readable storage medium coupled to the processor and storing programming instructions for execution by the processor, the programming instructions instruct the processor to:
obtain first data based on biometric feature data of a target user, wherein the first data is data obtained by the user device based on the data obtained by preprocessing a biometric feature of the target user;
send an authentication response message to an authentication device, wherein the authentication response message comprises the first data; and
receive indication information sent by the authentication device, wherein the indication information is used to indicate that the user device is authenticated,
wherein the authentication response message further comprises index information, the index information being configured to identify the user device or the target user,
wherein the programming instructions instruct the processor to:
collect the biometric feature data of the target user;

obtain target data based on the biometric feature data of the target user, wherein the target data is the data obtained by preprocessing the biometric feature of the target user; and convert the target data into the first data, and wherein the programming instructions further instruct the processor to:

send an authentication request message to the authentication device, wherein the authentication request message is used to request the authentication device to send a random data; and receive the random data sent by the authentication device; and wherein the programming instructions instruct the processor to:

calculate the target data and the random data by using a hash function, to obtain the first data.

11. The user device according to claim 10, wherein the first data is the target data, the target data is a first feature vector, and the first feature vector is a feature vector obtained by the user device based on the biometric feature data of the target user; or the first data is the target data, the target data is a first feature code, the first feature code is a feature code obtained after the user device converts a first feature vector, and the first feature vector is a feature vector obtained by the user device based on the biometric feature data of the target user.

12. The user device according to claim 10, wherein the first data is a second feature vector, the target data is a first feature vector, the random data is a random vector, and the first feature vector is a feature vector obtained by the user device based on the biometric feature data of the target user; or the first data is a second feature code, the target data is a first feature code, the first feature code is a feature code obtained after the user device converts a first feature vector, and the first feature vector is a feature vector obtained by the user device based on the biometric feature data of the target user.

* * * * *